US012548239B2

(12) United States Patent
Wilson

(10) Patent No.: US 12,548,239 B2
(45) Date of Patent: Feb. 10, 2026

(54) MASSIVELY PRE-RENDERED VIRTUAL BILLBOARD SYSTEM FOR HIGH SPEED, HIGH QUALITY DIGITAL ADVERTISING INSERTION IN LIVE MEDIA BROADCASTS

(71) Applicant: Hyannis Port Capital Inc., Lynnfield, MA (US)

(72) Inventor: John Wilson, Hyannis Port, MA (US)

(73) Assignee: HYANNIS PORT CAPITAL INC., Lynnfield, MA (US)

( * ) Notice: Subject to any disclaimer, the term of this patent is extended or adjusted under 35 U.S.C. 154(b) by 197 days.

(21) Appl. No.: 18/521,862

(22) Filed: Nov. 28, 2023

(65) Prior Publication Data
US 2024/0185394 A1 Jun. 6, 2024

Related U.S. Application Data

(60) Provisional application No. 63/385,116, filed on Nov. 28, 2022.

(51) Int. Cl.
G06T 15/20 (2011.01)
G06Q 30/0241 (2023.01)
G06T 5/20 (2006.01)
G06T 5/50 (2006.01)
G06T 7/11 (2017.01)
G06T 7/194 (2017.01)
G06T 7/20 (2017.01)
G06T 7/70 (2017.01)
G06T 7/80 (2017.01)
(Continued)

(52) U.S. Cl.
CPC ....... *G06T 15/205* (2013.01); *G06Q 30/0276* (2013.01); *G06T 5/20* (2013.01); *G06T 5/50* (2013.01); *G06T 7/11* (2017.01); *G06T 7/194* (2017.01); *G06T 7/20* (2013.01); *G06T 7/70* (2017.01); *G06T 7/80* (2017.01); *G06T 19/006* (2013.01); *H04N 23/695* (2023.01); *G06T 2207/20221* (2013.01)

(58) Field of Classification Search
CPC .... G06T 15/205; G06T 19/006; H04N 23/695
See application file for complete search history.

(56) References Cited

U.S. PATENT DOCUMENTS 6,384,871 B1 * 5/2002 Wilf ...................... H04N 5/2723
348/580
6,426,757 B1 * 7/2002 Smith ................... G06T 15/205
715/775
(Continued)

FOREIGN PATENT DOCUMENTS

WO WO-2011106520 A1 * 9/2011 ........... G09B 21/005

*Primary Examiner* — Charles Tseng
(74) *Attorney, Agent, or Firm* — NIXON PEABODY LLP

(57) ABSTRACT

A system for projecting content on live virtual billboards in a broadcast camera field of view is disclosed. The system pre-renders massive amounts of image content in order to insert the pre-rendered images into a live media feed with minimal time lag. The system combines real-time camera meta data (on pan, tilt, zoom and focal length) to select one of a set of pre-rendered content images for each camera location in a venue. The relevant pre-rendered digital images are inserted into a virtual billboard area of a field of view of the camera location in a real-time broadcast in order to create a lifelike and realistic viewer experience.

20 Claims, 12 Drawing Sheets

(51) Int. Cl.
*G06T 19/00* (2011.01)
*H04N 23/695* (2023.01)

(56) References Cited

U.S. PATENT DOCUMENTS

| | | | |
|---|---|---|---|
| 9,094,615 B2* | 7/2015 | Aman | G06Q 30/02 |
| 2011/0285809 A1* | 11/2011 | Feng | G10L 25/78 |
| | | | 348/E7.083 |
| 2022/0139046 A1* | 5/2022 | Gantzer | G06V 20/20 |
| | | | 345/419 |

* cited by examiner

MASSIVELY PRE-RENDERED VIRTUAL BILLBOARD SYSTEM FOR HIGH SPEED, HIGH QUALITY DIGITAL ADVERTISING INSERTION IN LIVE MEDIA BROADCASTS

PRIORITY CLAIM

The present disclosure claims priority to and benefit of U.S. Provisional Application No. 63/385,116, filed Nov. 28, 2022. The contents of that application are hereby incorporated by reference in their entirety.

TECHNICAL FIELD

The present disclosure relates generally to projecting images in live broadcasts and more specifically to a method and system for creating virtual billboards for use in live broadcast events by collecting camera data for imposition of pre-prepared image data in the live broadcast.

BACKGROUND

Physical signs and billboards containing advertising content have been in use for many decades. These signs have historically been fixed print placed on freestanding elevated platforms, positioned on the sides of large buildings and structures, or even attached to flying vehicles such as blimps or airplanes. While these conventional physical billboard systems may be suitable for many locations, they are suboptimal from many perspectives. All of these approaches require significant efforts and costs for obtaining the location rights and permits to build the physical signage platforms. They each incur substantial costs to physically construct and maintain the physical signage platforms as well as the cost to place and change the signs on the platforms. They also incur the real estate rental costs from the owner of the corresponding ground or building where the physical signage is to be attached. Additionally, there are physical, safety and aesthetic limitations as to where even semi-permanent signage can be placed at many venues.

Recent innovations have included replacing fixed print signage with electronic boards which provide dynamic image potential as well as allowing instant content changes. Most recently, "green screen" technology has been added to select signage locations, such as behind home-plate at a baseball game. This innovation allows for advertisers to change content live during an event as well as the potential to simultaneously stream completely different content to different viewers based on the platform or geography of groups of users. However, the green screen has to be physically anchored to a real estate location in the venue such as a flat surface and thus the location of such green screens is limited.

While some attempts have also been made to render and insert real time advertising into live events, the time lags, as well as the poor quality of such advertising to the viewing audience experience, have been unacceptable. Thus, the quality of such advertising and thus the viewing audience experience has been unacceptable in attempts to display virtual images in real-time broadcasts. The ability to render and continually update advertising images in real time for the nearly unlimited and rapidly changing pan tilt zoom (PTZ) positions for each camera location across multiple virtual billboard locations in a field of view for each camera PTZ position at each potential venue currently fails for two reasons. First, there is limited ability to check the quality of the advertising images to be inserted and adjusted for each PTZ position before live broadcasting of the merged content. Second, the lag time needed to adjust and render advertising images in real time before a live event can be broadcast prevents acceptable image presentation.

Thus, there is a need for a massively pre-rendered virtual billboard system for the purpose of increasing the number of advertising placement opportunities for broadcast or streaming audiences within and around live event venues. There is a need for improving the speed, ease and cost effectiveness of implementing virtual billboards in real time broadcasts. There is a further need for improving the quality of the viewing audience experience to make such virtual advertising at an arena venue feasible in real time. There is a further need to create new virtual advertising opportunities where a physical sign would block audience views or critical infrastructure. There is a further need for a system that enables expansion of virtual billboard sizes beyond real physical limitations. There is a further need for a system to enable dynamic content changes during an event to maximize utility versus the static messaging content of conventional signage. There is a further need for a system to enable multiple differentiated content to be delivered simultaneously to different target audiences.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim. According to certain aspects of the present disclosure, an example method of projecting an image on a sub-area of an area in a field of view of a first camera is disclosed. A frame image of the area and sub-area is captured from the first camera. Real-time pan, tilt, zoom and location data of the first camera corresponding to the frame image of the area is determined. The real-time pan, tilt, zoom and location data of the first camera corresponding to the frame image of the area is compared with collected pan, tilt, zoom data of the first camera for a plurality of pan, tilt, and zoom positions from a venue data library. A corresponding pre-rendered first content image and reference point data of the perimeter of the sub-area corresponding to one of the plurality of pan, tilt, and zoom positions from the library based on the comparison is determined. The corresponding pre-rendered first content image is applied to the sub-area in the frame image to create a first broadcast image. The first broadcast image with the applied pre-rendered first content image in the sub-area is broadcast.

A further implementation of the example method is an embodiment where the method further includes determining a corresponding pre-rendered second content image corresponding to one of the plurality of pan, tilt, and zoom positions from the library based on the comparison. The second content image is different from the first content image. The corresponding pre-rendered second content image to the sub-area in the image at a different time is applied to create a second broadcast image. The second broadcast image with the applied pre-rendered second content image on the sub-area is broadcast at the different time. Another implementation is where the example method includes capturing a frame image of the area and sub-area from a second camera having a different location than the first camera. Real-time pan, tilt, zoom and location data of the second camera corresponding to the frame image of the area from the second camera is determined. Real-time pan, tilt, zoom and location data of the second camera corresponding to the frame image of the area is compared with collected pan, tilt, zoom data of the second camera for a plurality of pan, tilt, and zoom positions of the second camera from the venue data library. A corresponding pre-rendered second content image and reference point data of the perimeter of the sub-area corresponding to one of the plurality of pan, tilt, and zoom positions from the library is determined based on the comparison. The corresponding pre-rendered second content image is applied to the sub-area in the frame image from the second camera to create a second broadcast image. The second broadcast image with the applied pre-rendered second content image on the sub-area is broadcast. Another implementation is where the example method includes determining an ambient condition of the area; and filtering the pre-rendered content image based on the ambient condition of the area. Another implementation is where the ambient condition is one of weather or time of day, and the filtering changes the lighting of the pre-rendered content image. Another implementation is where the example method includes tracking an object from the frame image in the sub-area; and inserting the object into the sub-area to replace part of the pre-rendered content image for the broadcast image. Another implementation is where the object is inserted if it is above a threshold value. Another implementation is where the example method includes capturing a series of frame images from the first camera including the frame image. The rate of change between pan, tilt, and zoom positions of the first camera in capturing the series of frame images is determined. An interpolation frame is created to smooth the rendered first content image between the series of frame images. The interpolation frame is added to the sub-area of the broadcast image. Another implementation is where the area is in an event or a sports venue.

Another disclosed example is a system to project an image on a sub-area of an area for broadcast. The system includes a first camera capturing a frame image of the area and sub-area. The first camera captures real-time pan, tilt, zoom data of the first camera corresponding to the frame image. The system includes a library of collected pan, tilt, and zoom position data for the first camera, reference point data of a perimeter of the sub-area for each pan, tilt, and zoom position of the first camera, and corresponding pre-rendered content images for each pan, tilt, and zoom position of the first camera. An augmented reality engine is coupled to the library. The augmented reality engine is operable to compare the real-time pan, tilt, zoom and location data of the first camera corresponding to the background frame to the collected pan, tilt, and zoom position data for the first camera. The augmented reality engine is operable to determine a pan, tilt, and zoom position for the first camera based on the comparison. The augmented reality engine is operable to interpose a corresponding pre-rendered first content image from the library on the sub-area of the frame image to create a first broadcast image.

A further implementation of the example system is an embodiment where the augmented reality engine is further operable to broadcast the first broadcast image. Another implementation is where the augmented reality engine is further operable to determine a corresponding pre-rendered second content image stored in the library corresponding to one of the plurality of pan, tilt, and zoom positions from the library based on the comparison. The second content image is different from the first content image. The augmented reality engine is further operable to apply the corresponding pre-rendered second content image to the sub-area in the image at a different time to create a second broadcast image. The augmented reality engine is further operable to broadcast the second broadcast image with the applied pre-rendered second content image on the sub-area at the different time. Another implementation is where the example system further includes a second camera having a different location than the first camera. The second camera captures a frame image of the area and sub-area and real-time pan, tilt, zoom data of the second camera corresponding to the frame image. The augmented reality engine is operable to determine real-time pan, tilt, zoom and location data of the second camera corresponding to the frame image of the area from the second camera. The augmented reality engine is operable to compare real-time pan, tilt, zoom and location data of the second camera corresponding to the frame image of the area captured by the second camera with collected pan, tilt, zoom data of the second camera for a plurality of pan, tilt, and zoom positions of the second camera from the venue data library. The augmented reality engine is operable to determine a corresponding pre-rendered second content image and reference point data of the perimeter of the sub-area corresponding to one of the plurality of pan, tilt, and zoom positions of the second camera from the library based on the comparison. The augmented reality engine is operable to apply the corresponding pre-rendered second content image to the sub-area in the frame image from the second camera to create a second broadcast image. Another implementation is where the augmented reality engine is further operable to determine an ambient condition of the area; and filter the pre-rendered content image based on the ambient condition of the area. Another implementation is where the ambient condition is one of weather or time of day, and where the filtering changes the lighting of the pre-rendered content image. Another implementation is where the augmented reality engine is further operable to track an object from the frame image in the sub-area; and insert the object into the sub-area to replace part of the pre-rendered content image for the first broadcast image. Another implementation is where the object is inserted if it is above a threshold value. Another implementation is where the augmented reality engine is further operable to receive a series of frame images from the first camera including the frame image. The augmented reality engine is further operable to determine the rate of change between pan, tilt, and zoom positions of the first camera in capturing the series of frame images. The augmented reality engine is further operable to create an interpolation frame to smooth the rendered first content image between the series of frame images. The augmented reality engine is further operable to add the interpolation frame to the sub-area of the broadcast image. Another implementation is where the area is in an event or a sports venue.

Another disclosed example is a non-transitory computer-readable medium having machine-readable instructions stored thereon, which when executed by a processor, cause the processor to receive a frame image of an area and sub-area captured from a first camera. The instructions further cause the processor to receive real-time pan, tilt, zoom and location data of the first camera corresponding to the frame image of the area. The instructions further cause the processor to compare real-time pan, tilt, zoom and location data of the first camera corresponding to the frame image of the area with collected pan, tilt, zoom data of the first camera for a plurality of pan, tilt, and zoom positions from a venue data library. The instructions further cause the processor to determine a corresponding pre-rendered first content image and reference point data of the perimeter of the sub-area corresponding to one of the plurality of pan, tilt, and zoom positions from the library based on the comparison. The instructions further cause the processor to apply the corresponding pre-rendered first content image to the sub-area in the frame image to create a broadcast image.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining several embodiments of the invention in detail, it is to be understood that the invention is not limited in its application to the details of the construction, configuration or arrangement of the components set forth in the following descriptions or illustrated in the drawings. The invention is capable of other embodiments and of being practiced and carried out in various ways. Also, it is to be understood that the phraseology and terminology employed herein are for the purpose of description and should not be regarded as limiting.

To the accomplishment of the above and related objects, this invention may be embodied in the form illustrated in the accompanying drawings, attention being called to the fact, however, that the drawings are illustrative only, and that changes may be made in the specific configuration and processes illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, wherein.

DETAILED DESCRIPTION

Figure 1:
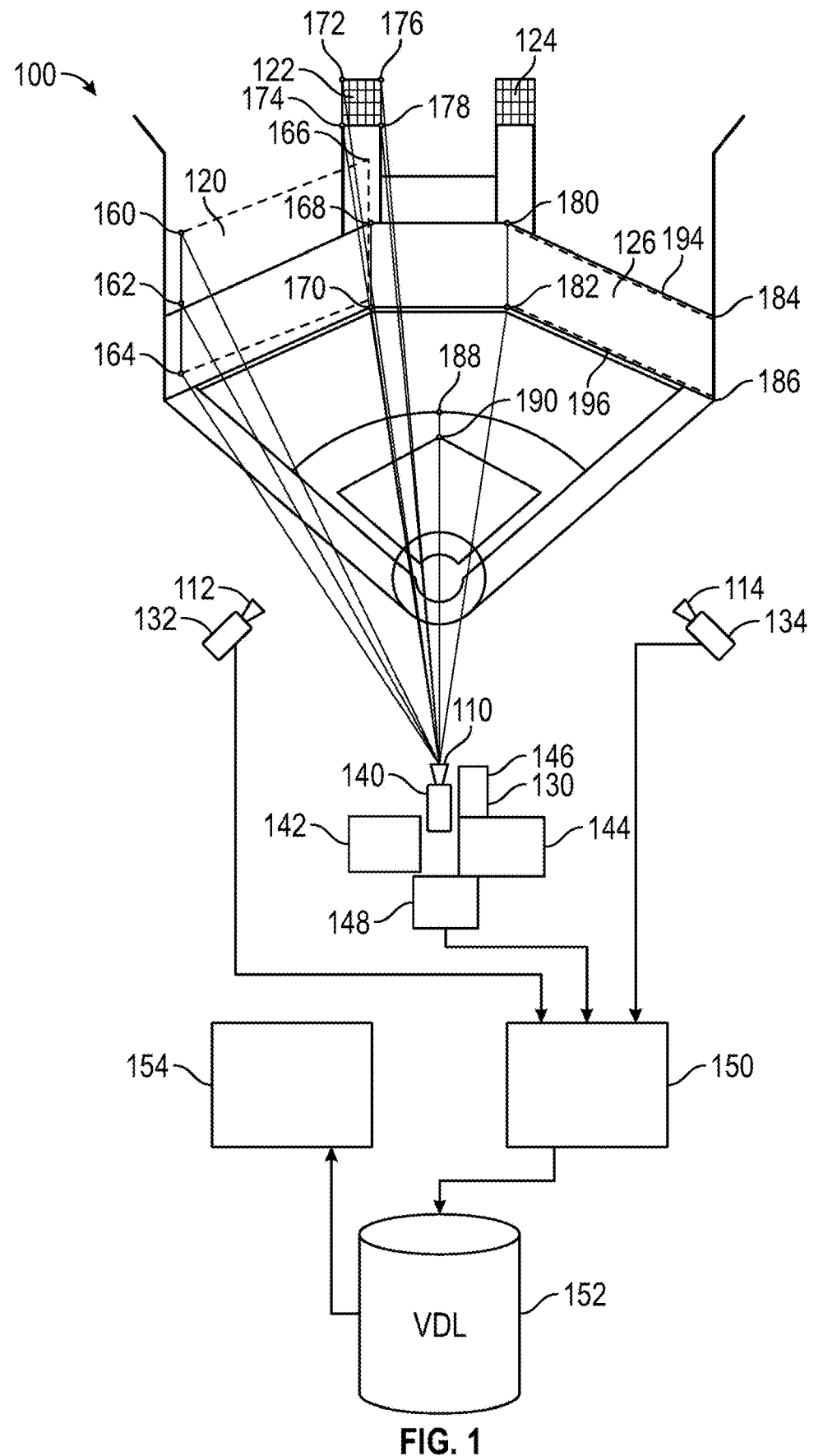
FIG. 1 is a diagram of an example stadium venue with multiple camera locations and multiple virtual billboard locations as a simple model of the types of data to be captured pre-live event by camera position.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially,"

"approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The general purpose of the disclosure, which will be described subsequently in greater detail, is to provide a virtual billboard system that has many of the advantages of the conventional billboards mentioned heretofore and many novel features that result in nearly unlimited sets of virtual advertising placement options for live events across all venue types.

This disclosure relates to a massively pre-rendered virtual billboard system for the purpose of increasing the number of advertising placement opportunities at a live venue, improving the speed, ease and cost effectiveness of implementing these virtual billboards as well as improving the quality of the viewing audience experience to make such virtual advertising feasible.

The disclosed example augmented reality broadcast system has seven integrated components. 1) A venue data collection system that includes a high resolution digital video camera, which captures images of the venue and also captures and transmits precise real-time pan tilt zoom (PTZ) data from the camera. 2) An automated camera drive system to position the camera to rapidly scan, capture and store the relevant image and reference point data across PTZ locations for each venue and camera combination in a high speed venue data library (VDL). 3) An automated physical ranging device which attaches to the onsite digital video camera for locating, sizing, and anchoring both transmitter and visual reference points into the VDL. 4) A system that generates automated 3-D venue "skeleton maps" populated with the virtual billboard perimeter(s) as virtual "green screens" positioned and anchored in the 3-D maps by camera specific PTZ meta data as well as reference points for all PTZ combinations. 5) A rendering system and algorithm which pre-renders the desired content images into each virtual billboard "green screen" location within the specific field of view for each camera PTZ combination and repeats this process across all PTZ combinations for each camera. In this example, approximately 10 million to 100 million different field of view "green screen" images per venue may be stored and archived by camera PTZ position in the high speed venue data library. 6) High speed motion tracking and silhouetting devices positioned at each camera where foreground motion is anticipated during the live event to edit virtual billboard "green screen" dimensions when objects cross the view range. 7) An ultra high speed augmented reality (AR) system and software engine that creates a lifelike, frame by frame composite of the pre-rendered virtual image content from the venue data library and the live event video feed with minimal lag. The example system enables frame to frame interpolation when needed for situations with extremely rapid camera PTZ changes as well as adjustment for ambient conditions through digital layering to provide even more virtual billboard realism for viewing audiences.

FIG. 1 is a schematic showing a typical venue 100 that may be used to provide virtual billboards for a live broadcast with the example virtual billboard mapping and broadcast system. In this example, the venue 100 is a sports stadium such as a baseball park, but the example virtual billboard mapping and broadcast system may be used with any suitable sport or other venue either indoors or outdoors. The venue 100 includes multiple camera locations 110, 112, and 114 that allow broadcast of views of different areas of the venue 100 from the point of view of cameras in each of the camera locations 110, 112, and 114. The venue 100 may have multiple virtual billboard locations 120, 122, 124, and 126 that may be defined by the example billboard mapping system. Each of the virtual billboard locations 120, 122, 124, and 126 may be in view or partially in view of the cameras in each of the camera locations 110, 112, and 114. The system creates a simple model of the types of data to be captured by camera position prior to broadcast of a live event at the venue 100 with inserted content.

Each of the camera locations 110, 112, and 114 in this example may have a respective camera system 130, 132, and 134. It is to be understood that there may be any number of camera locations and corresponding cameras in a venue that may incorporate the principles described herein. Each of the camera systems such as the camera system 130 includes a high resolution digital video camera 140, a high speed actuator drive system 142, a memory 144 for storing captured images, a range sensing device 146, and a transceiver 148 for communicating with a data collection and processing system 150. In this example, the digital video camera 140 is preferably a camera that captures position data with images such as filmmaking cameras available from Sony, Black Magic Cinema Cameras available from Blackmagic Design, or RED cameras from RED. The cameras may be modified to include zoom data in a separate data output. The actuator drive system 142 may be a gimbal that may be programmed such as a Ronin 2 gimbal from DJI with software that may be developed for control of the gimbal from a computer or other control device. The software will also record different pan and tilt positions of the gimbal and allow output of the pan and tilt position to be combined with the zoom data. The range sensing device 146 ranges and geolocates location transmitters and visual reference points as will be explained below. The range sensing device 146 may be a range finder integrated in the camera or be accomplished through an external laser range finder such as a LRF 3013 Laser Rangefinder from UltiSense. Alternatively, a light detection and ranging (LIDAR) range finding device may be used to range and geolocate location transmitters and visual reference points. The data collection system 150 includes a venue data library 152 for storing captured data from the camera systems such as the camera system 130.

The high speed actuator drive system 142 is programmed to move the camera 140 to perform high speed scans and data collection along desired pan and tilt points. The data capture for pan and tilt points is repeated across points within desired zoom ranges of the cameras. The collected pan, zoom, and tilt data is sent to the data collection system 150 and archived for the camera position in the venue data library 152 for all pan, zoom, and tilt positions of the camera location. Additional real time metadata including the pan, tilt, and zoom data, focal length, auto ranging, and multiple reference point captures are correlated with the captured images and stored in the venue data library 152. As will be explained in detail, the venue data library 152 stores the captured real time meta data for each camera location as well as stored image content for an augmented reality system 154 that includes an augmented reality engine that inserts of the image content in the virtual billboard locations 120, 122, 124, and 126 into the live image feed captured from the camera during live broadcasts.

The venue 100 is defined by a series of reference points that allow definition of the virtual billboard locations 120, 122, 124, and 126. The billboard locations may be defined through digital coordinates in the view that correlate with the PTZ data corresponding to each view. Such locations may be defined by additional positional data obtained from the range sensing device 146. For example, the billboard location 120 may be defined by a series of transmitter reference points (TRP). The transmitter reference points may be position data sent by a series of reference location transmitters 160, 162, 164, 166, 168, and 170 that are located physically on the perimeter of the virtual billboard location 120. Thus, the virtual billboard location 120 may be further defined by location data from each of the six location transmitters 160, 162, 164, 166, 168, and 170 in this example. More or fewer location transmitters may be used. The location transmitters may be permanently installed in the locations in the venue or they may be installed temporarily during the data collection process and reused for other venues.

Alternatively or additionally, a series of visual content reference points (VRP) may be used as reference points to define the perimeter of the virtual billboard. For example, four virtual content reference points 172, 174, 176, and 178 are used to define the perimeter of the virtual billboard location 122. Another four virtual content reference points 180, 182, 184, and 186 are used to define the virtual billboard location 126 in this example. The content reference points are distinct images of objects in the venue 100 such as light fixtures in the example of the virtual content reference points 172, 174, 176, and 178. Other virtual content reference points may be used such as a virtual content reference point 188, which is the edge of the infield, and a virtual content reference point 190, which is second base in this example. A series of vanishing point reference lines are used to define the trapezoidal shape of billboard locations that are to the right or to the left of the camera view. The vanishing point reference lines are drawn from the corners of reference points in each virtual billboard location. In this example, a dashed line 194 between the reference points 180 and 184 and a dashed line 196 between the reference points 182 and 186 represent vanishing point reference lines (VPL) that allow the content to be sized to a trapezoidal shape for different camera views.

In this example, prior to a scheduled live event, the venue 100 may be fitted with numerous reference locating transmitters such as the reference location transmitters 160, 162, 164, 166, 168, and 170. The transmitters are placed as close to the planned virtual billboard perimeter locations such as the billboard location 120 as possible. Alternatively, or in addition, various objects may be defined as virtual content reference points that provide visual reference to the planned virtual billboard perimeter. Finally, coordinates may be designated in areas of views such as background sky that may also define a planned virtual billboard perimeter.

At each camera location such as the camera location 112, high resolution digital video cameras such as the camera 140 are positioned and stabilized. The operator will also input the vertical top and bottom range of the actuator drive system 142, the horizontal side to side range or the actuator drive system 142, and the determined distance from a transmitter location transmitter or a visual reference point that is roughly the furthest from the camera location to the controller of the high speed actuator drive system 142. The ranges and distance provide the parameters for the controller to move the camera 140 to collect the pan, zoom, and tilt data along the desired points. Each of the camera systems such as the camera system 130 allow high resolution, real-time meta data tracking of PTZ data as well as collection of ranging data for reference points from a range sensing device such as the device 146. The range data is collected by the range sensing device 146 and/or location transmitters and associated with corresponding PTZ data. The collected meta data is transmitted to the data collection system 150 through the transceiver 148. The cameras are fitted with the example actuator drive system 142 that is controlled by a control program to rapidly scan the targeted field of view of the camera at different points according to the vertical and horizontal ranges and ranges. The cameras are programed capture as is images as well as reference point data for all PTZ permutations at the different points. The actuator drive system 142 may be locally controlled or remotely controlled by the data collection system 150. The number of data points scanned across each pan divides the range of fields of view into less than ½ of 1% of the pan range in order to reduce pixel size differences for a high definition (HD) camera to be less than 10 pixels.

As shown in FIG. 1, cameras such as the camera 140 is controlled with the actuator drive system 142 to pan across the full desired range of view (approximately 120 degrees of desired camera pan range). In this example, the camera 140 captures pan data every ½ degree for each given vertical tilt position. The camera actuator drive system 142 is then controlled to automatically tilt the camera 140 up in 1 degree increments and repeat the full range pans for each 1 degree change in the tilt position. This occurs over approximately 75 degrees of the desired camera tilt range in this example. For each pan, tilt, zoom (PTZ) position, the as is image of the field of view is captured by the camera 140. The corresponding PTZ meta data as well as all in frame reference point data of the field of view for the PTZ position is collected and transmitted to and stored in the venue data library (VDL) 152. Thus, the PTZ meta data includes the pan value, the tilt value, the zoom value, and range data for all reference points viewable in the field of view. Reference points from the virtual reference points may be inserted by the data collection system 150 based on identification of these objects from the captured image. The data collection system 150 may also insert coordinates in the field of view that are not anchored to a location transmitter or object.

This process will repeat across each vertical tilt position until the entire field of view for a given zoom setting of the camera 140 is scanned. In this example, data from approximately 25,000 different camera positions will be captured per zoom position. The camera zoom then is automatically adjusted forward by the camera drive system 142 to zoom in ¹⁄₁₀₀th of the range to the outer edge of the venue 100. For example, for a venue with 500 feet from the camera position to the position of the virtual billboard, this zoom is in 5 foot increments. The previous pan and tilt scanning process is then repeated until all combinations are captured in the VDL library 152.

In this example, this process generates approximately 2.5 million unique PTZ fields of view per camera location with 150 degrees of pan, 90 degree of tilt, and 500 feet depth zoom to a virtual billboard location for a large venue such as a baseball or football stadium. Different numbers of PTZ fields of view may be generated for smaller venues such as a basketball arena or a theater. Different numbers of PTZ fields of view may be generated for different degrees of pan and tilt, and depth zoom. Each camera at each of the camera locations such as the cameras 112, 114, and 116 will perform these same tasks in parallel and send the collected data to the data collection system 150. The data collection process for the entire venue takes several hours for the largest venues such as a football stadium with less time for correspondingly smaller venues. All of the processed output data from each camera such as the camera 140 is stored in the venue data library (VDL) 152 to be rapidly accessible by the augmented reality system 154.

Figure 2:
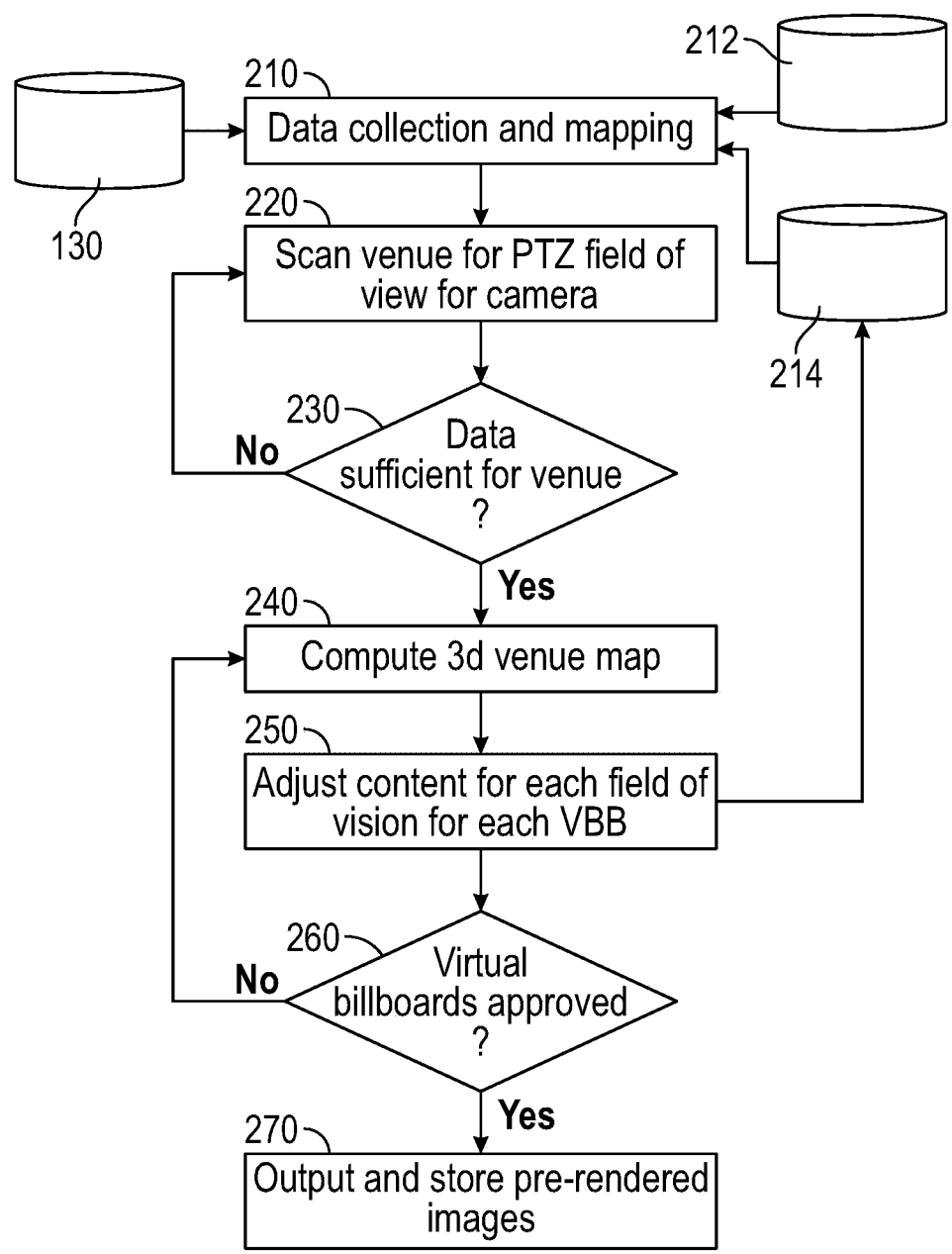
FIG. 2 is a flow diagram of the data capturing and archiving input process as well as the outputs from the example data collection process that are stored in an electronic venue data library.

FIG. 2 is a flow diagram showing the data capturing and archiving process for one camera in a venue. The process in FIG. 2 is executed by the data collection system 150 in FIG. 1. In this example, the data collection system 150 may collect data for different sites such as the venue 100 based on the set up of camera systems and location transmitters within each site. The system 150 also stores other data such as the content to be displayed on each of the virtual billboards to store the content data and metadata for storage in the electronic venue data library 152 in FIG. 1. The system 150 renders sets of the images that are matched with each PTZ position of each camera location.

Real time data is collected by each of the camera systems for a venue such as the camera system 130 in FIG. 1 as explained above. Different venue inputs are also collected by the data collection system 150. The venue inputs may include camera data inputs 212 and content inputs 214. The camera data inputs 212 include the desired camera locations and ranges of the desired pan, tilt, and zoom for the camera location as explained above. The camera data inputs are collected by the data collection system 150 from each transceiver of each camera system as the camera is positioned by the actuator system (210). The content inputs 214 include the desired virtual billboard locations, the sizes of the locations, and image content intended to be placed in the virtual billboard locations. In this example, the image content may be high resolution graphics such as advertising content. A corresponding rendered image from the image content is stored for insertion on a virtual billboard for a fixed pan zoom and tilt position for one or more of the cameras. Thus, multiple rendered images each corresponding to fixed pan zoom and tilt position are stored in the venue data library 152.

The routine then actuates the actuator system and the camera in the camera system to scan the venue 100 with multiple pan, tilt, and zoom fields of view (220). After collecting an initial set of data, the process allows an operator to determine whether the collected data is sufficient for the requirements of a 3D library entry for the venue (230). If the collected data is insufficient, the process loops back to collect additional scans. If the collected data is sufficient, the process creates a 3D venue map including sized virtual billboard green screens (240). The 3D venue map includes each individual field of view for each camera position. An example set of field of views may be 2.5 million field of views for one camera position.

The content from the content inputs 214 is then adjusted for each virtual billboard green screen appearing in each field of view (250). For example, the content will be sized to the billboard perimeter in the field of view. The vanishing point lines are used to size the content into a trapezoid if the billboard appears on either side of the camera position. The adjusted rendered content image for the specific field of view is stored in the content inputs file 214. The system then allows an operator to review the content for each of the virtual billboard and input whether the billboards are approved (260). If the billboards are not approved, the routine loops back to the creation of the 3D venue map and adjusts the virtual billboard green screens (240). If the billboards are approved, the routine stores a library of the resulting pre-adjusted or pre-rendered image content (270) to the venue data library 152. The library includes millions of pre-adjusted or pre-rendered images as each of the PTZ locations has a corresponding pre-adjusted image. A set of pre-adjusted images is stored for each of the camera positions for the venue. The stored content file includes the millions of pre-adjusted images with dual anchoring data through the associated PTZ points and the reference points from the camera data input 212. The output data stored in the venue data library 152 includes different PTZ field of views for each camera position in a venue such as the venue 100. The stored images include multiple reference points per frame to indicate the location of the virtual billboards.

After collecting the data from each of the camera positions, the example software on the data collection system 150 builds separate 3-D skeleton frame models for each camera PTZ position combination. The frame models are combined into a skeleton 3D venue map that includes virtual green screens positioned for each PTZ combination of the camera location. Each of the images for each PTZ combination is anchored by the camera PTZ output as well as reference points of view.

The 3-D model for each camera PTZ position is a two point perspective with multiple horizontal vanishing point lines across for each vertical plane. The example software locates every desired virtual billboard location with the 3-D space. The 3-D space has adjusted virtual billboard perimeters located in the 3-D skeleton model for each camera PTZ position combination. The perimeter of each virtual billboard is located (if visible in that particular frame field of view). The perimeter is dual anchored by the PTZ metadata and reference points as available in that field of view for each virtual billboard/PTZ combination. The example software checks each PTZ position that has at least a portion of one virtual billboard perimeter within the frame to identify if that frame has one or more reference points defined by a location transmitter such as the location transmitters 160, 162, 164, 166, 168, and 170 or virtual reference points such as the virtual reference points 180, 182, 184, and 186 in FIG. 1. The reference points from the location transmitters or virtual reference objects from the images are used to anchor all virtual billboard perimeters within the frame. If no transmitters or reference objects are within the frame, then the example software anchors the virtual billboard based on the camera specific PTZ metadata correlated with the virtual billboard perimeter coordinates in that view. These perimeters constitute the virtual billboard "green screens" for the frame. Each virtual billboard "green screen" for each PTZ frame has automatically rendered 3-D trapezoidal shapes depending upon planned size and location versus the camera PTZ position. The trapezoidal shape is based on data received and the determination of vanishing sight lines 192 and 194 in FIG. 1. The virtual billboard "green screens" are preferably dual anchored, where possible, by camera metadata on PTZ as well as reference points (either by location transmitter or visual reference points). As the accuracy of the PTZ meta data is confirmed for a given venue and camera system by the anchor points, the virtual billboard green screens can anchored by the software models alone.

Desired image content such as advertising images for each virtual billboard location in a venue is loaded into the venue data library 152 in high resolution. The example software then automatically rotates, shapes, and renders each image with the appropriate scale, focus and blur to conform the image content on the virtual billboard location consistent with its location in the 3-D model relative to the specific PTZ position for that camera. This process is repeated in parallel for each camera location at the venue. Depending upon the number of cameras and virtual billboards desired at the venue, the total number of pre-rendered advertising "green screen" images across all camera PTZ field of view combinations may range from 25 million to 250 million images for a venue. Each pre-rendered image will have the relative scale and degree of focus or blur based on the camera distance in the 3-D model relative to the camera PTZ meta data. Each of these pre-rendered image(s) is anchored to a specific camera/PTZ combination as well as reference points available in that PTZ image field of view. This massive data set of images is loaded into the venue data library 152 with a rapidly searchable and accessible architecture related to each camera/PTZ combination. The server for the augmented reality system 154 that accesses the venue data library 152 is preferably capable of ultra high speed processing. The server for the augmented reality system 154 is preferably located on site at the venue 100 to minimize lag times when the server populates the augmented reality (AR) system 154 with data from the venue data library 152. The server of the augmented reality system 154 is thus an augmented realty engine that assembles real time frame images with the pre-rendered content. Although single image content may be assigned for each virtual billboard, different image content may be associated with each virtual billboard and associated with the camera/PTZ combination. The different content images may be interposed at different times. Alternatively, the different content images may be inserted for broadcast to different segments of viewers. For example, a first content image may be stored for broadcast for a first geographic region, while a second content image may be stored for broadcast for a second geographic region during the broadcast.

Figure 3:
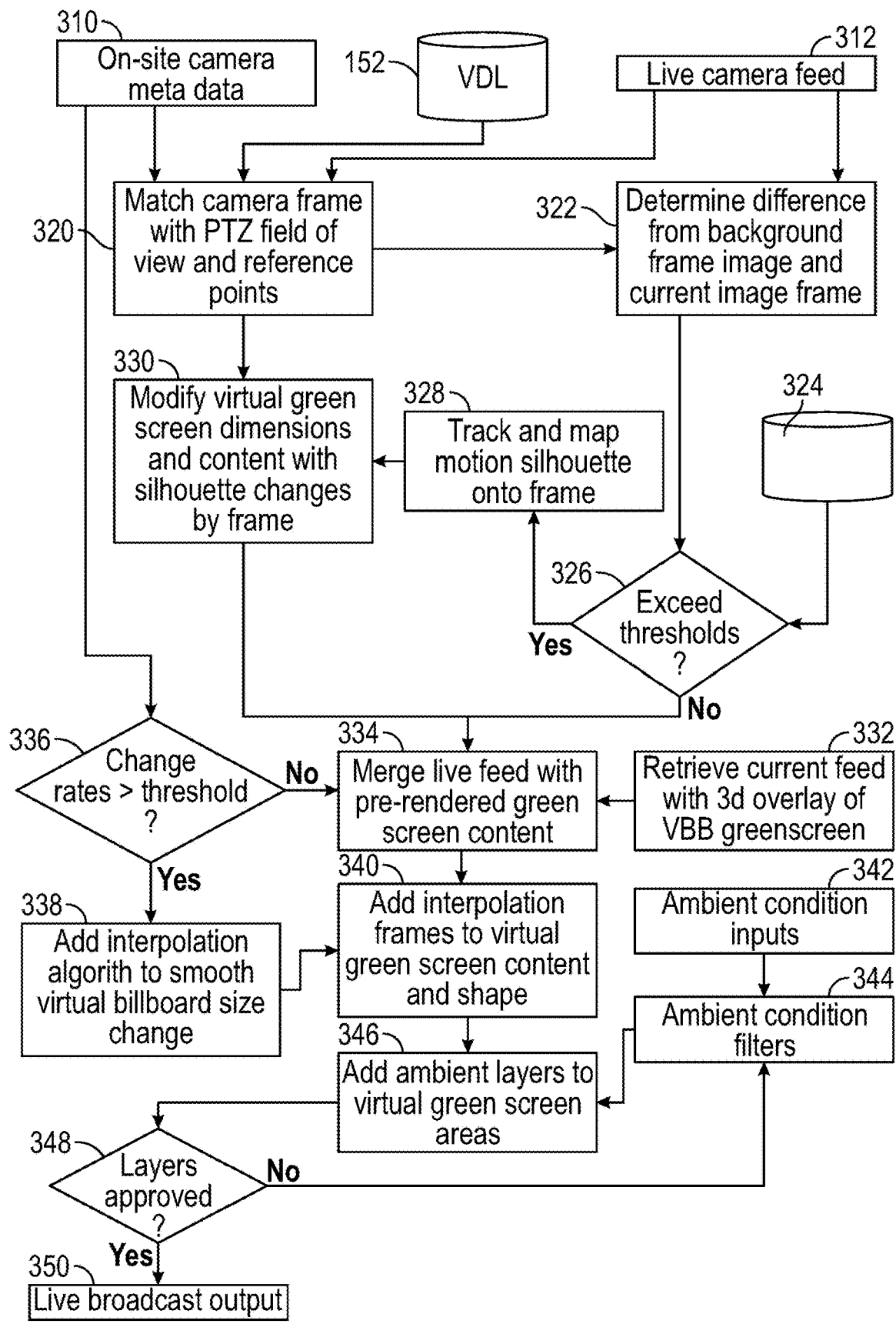
FIG. 3 is a flow diagram of the augmented reality process flow that receives venue data library inputs, camera meta data, and live camera feeds and delivers realistic, real time broadcast of quality virtual content.

FIG. 3 shows the augmented reality process flow that is executed by the augmented realty engine of the augmented reality system 154 in FIG. 1 to delivery realistic, real time broadcast quality virtual content of an event occurring at the venue 100. The routine includes input data from the venue data library 152, camera meta data 310 from an on-site camera, and a live camera feed 312 from the on-site camera. The camera meta data 310 is transmitted from an on-site camera that generates real-time meta data including pan, tilt, and zoom positions and GPS coordinates. The live camera feed 312 includes frame images captured by the camera of the venue at a camera position (defined by the real-time meta data) during a live broadcast. The input data from the venue data library 152 is collected via the process in FIG. 2 and includes multiple fields of view (defined by PTZ meta data) with as is images, a 3D overlay, and reference points, as well as a collection of the pre-rendered images.

The process first collects input data from the venue data library 152, the camera meta data 310, and the live camera feed 312. The collected data is used to match the camera frame as determined from the camera meta data 310 with a PTZ field of view and reference points from the venue data library 152 (320).

A motion tracking and silhouetting program is executed by the augmented reality system 154. The sensitivity of the motion tracking software is set to distinguish between foreground large perimeter motion and background micro perimeter motion by an object such as a player or runner close to the camera versus a spectator moving deep in the outfield. Venue specific thresholds can also be added to better track specific small scale items like footballs, baseballs, soccer balls and the like that may rise into the field of view of a virtual billboard area.

The matched camera frame is sent as a background frame image with a 3-D overlay of the virtual green screen perimeters and compared with the current frame data from the live camera feed 312 (322). The background frame images with the 3-D overlay and the current frame data from the live camera feed 314 are compared with an appropriate threshold value to determine the importance of the object. The threshold values are input from a threshold database 324 that includes venue specific tracking thresholds for different objects such as ball sizes, colors, ball speed, people, and equipment. The motion tracking algorithm is based on an enhanced background subtracting method which compares the background frame and pre motion frames for each PTZ position to the current PTZ frame content from the live camera feed. This difference calculator is used to generate a silhouette of the foreground movement of the object. If the difference exceeds the threshold value (326), the routine tracks and maps the motion silhouette onto the frame with the silhouette (328). This silhouette is thus superimposed on the affected "green screens" for each PTZ combination and the image content pre-rendered for that specific PTZ "green screen" is correspondingly adjusted to add the image of the object. This allows frame to frame tracking of change in motion of an object on the green screen and allows the insertion of the object from the live camera feed.

The green screen size, dimensions, and location, that match the frame data is retrieved from the venue data library 152 (332). The matched camera frame data with any motion silhouette is used to modify the virtual green screen dimensions and content with silhouette changes by frame (330). The matched frame data, pre-rendered green screen content, and motion silhouette is merged with the live feed (334). If the difference between objects on the live feed and the green screen areas does not exceed the threshold value (326), the matched green screen dimensions and content are merged with the live feed without the object (334).

An interpolation algorithm is also executed by the augmented reality system 154, when necessary, to "smooth" rapid changes in PTZ positions. The metadata input 310 from the live camera is analyzed to determine if objects have a change rate that exceeds a threshold value (336). If the change rate is under the threshold value, the routine proceeds to merge the content with the live feed (334). If the rate of change for the camera exceeds the preset threshold, an interpolation frame is created by the interpolation algorithm to smooth the virtual billboard size and change between the frames (338). This interpolated frame is the average of the prior PTZ "green screen" content and the next anticipated "green screen" image expected based on the most recent changes in the PTZ positions continuing. The routine adds the interpolation frames, if any, to the virtual green screen content and shape (340). Thus, the augmented reality routine merges the live camera feed with the final "green screen" content to create a lifelike frame by frame composite with minimal lag.

As a final step to improve the realism of the composite augmented reality image, ambient condition layers can also be added to the final "green screen" areas. These layers can be added to superimpose filters that reflect varying weather conditions (e.g., degrees or rain, wind, snow, and fog) or time of day lighting conditions such as shade or other desired adjustments to the virtual billboard appearance such as altering opacity or brightness.

The system accepts a set of ambient condition inputs 342. The ambient condition inputs 342 may include weather or time of day or other lighting considerations from commercially available light monitoring devices. The ambient condition inputs 342 are filtered to the content images based on lighting in this example (344). The filtered ambient conditions are added to the content on the virtual green screen areas (346). The layers may then be reviewed by an editor and approval may be provided (348). If the layers are not approved, the routine loops back to filtering the ambient conditions (344). If the layers are approved, the augmented reality system 154 provides a live broadcast output 350 with the image of the live feed with the content interposed over the green screen areas for the frame at the particular PTZ frame to create a broadcast image. The broadcast image also includes objects that are silhouetted on the green screen and adjustments of the content on the green screen for ambient conditions. The final composite output is a broadcast image with realistic embedded virtual billboards in the live feed that is then delivered with minimal time lag by the augmented reality system 154 to different broadcast media such as television, video, streaming or the like.

As explained above, different images may be inserted at different times as long as such images are pre-rendered at different times in the broadcast. In addition, different images may be inserted to create two or more simultaneous broadcasts having the same live-feed image but different content on the green screen in the field of view. This allows targeting of content for different audiences.

Figure 4A:
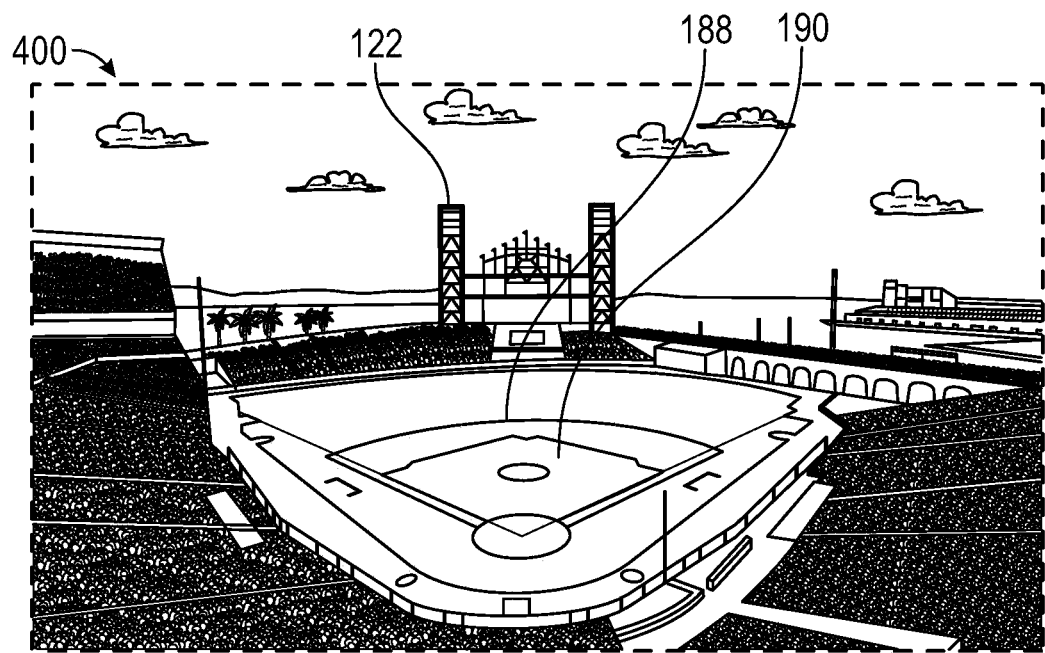
FIG. 4A is an example camera view of the example stadium venue in FIG. 1.

FIG. 4A is a camera view 400 of the venue 100 showing the physical locations in the stadium. For example, virtual reference points for different objects may be recorded such as the virtual reference point 190 for second base or the virtual reference point 188 that is anchored at the edge of the infield. Various location transmitters may also be positioned in different areas of the venue 100 such as the location of the virtual billboard 122 as explained above.

Figure 4B:
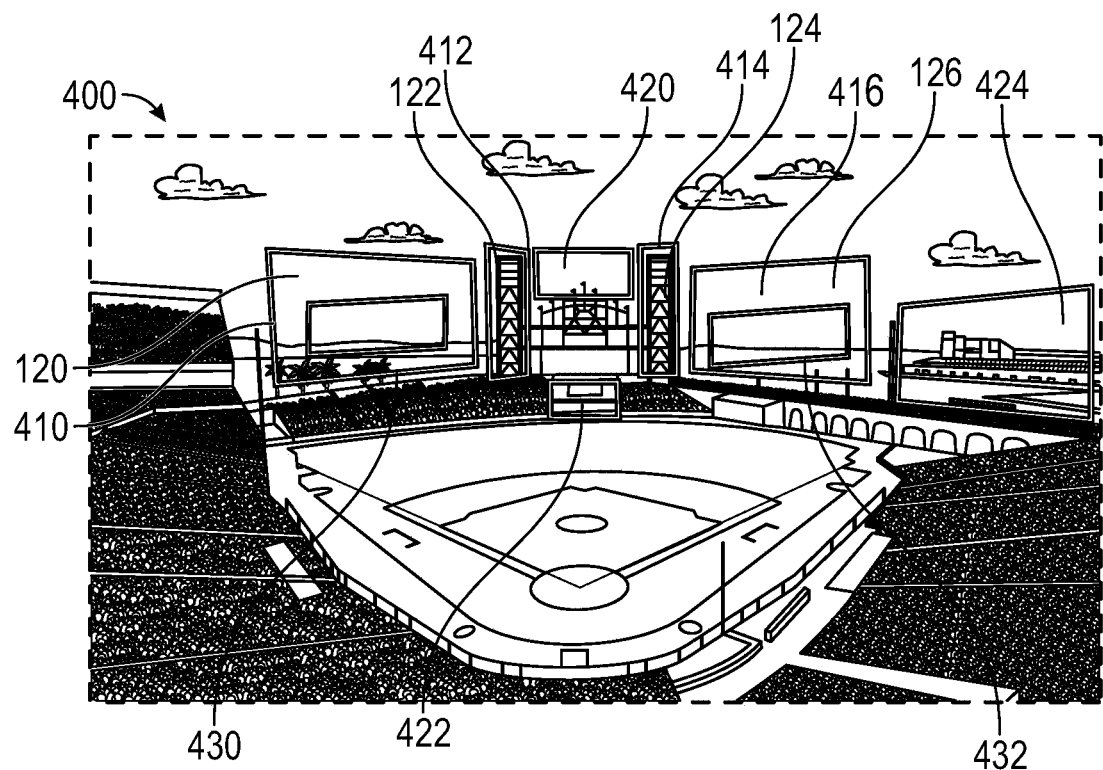
FIG. 4B shows an example set of skeleton frames overlaying the venue from the camera view in FIG. 4A.

FIG. 4B shows skeleton frames 410, 412, 414, and 416 interposed over the respective virtual billboard locations 120, 122, 124, and 126 in the venue 100 in FIG. 1. Additional skeleton frames 420, 422, and 424 are created to represent additional virtual billboard locations based on coordinates matched with the PTZ meta data. In this example, another frame 430 is defined within the virtual billboard location 120. The frame 430 is smaller in area than the frame 410. Similarly, a frame 432 is defined within the virtual billboard location 126. Thus, content images may be sized for the frames 430 and 432 instead of content images sized for the frames 410 and 412. Alternatively, the frames 430 and 432 and corresponding content images may be selectively employed instead of content images associated with the frames 410 and 412 during the broadcast.

Figure 4C:
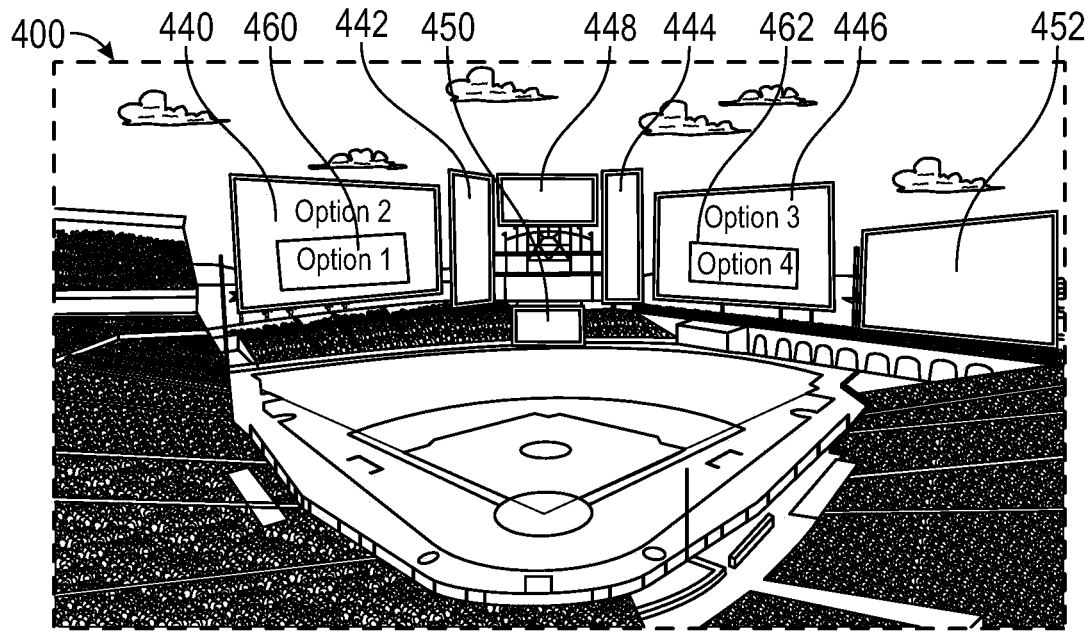
FIG. 4C shows an example imposition of green screens on the skeleton frames in FIG. 4B.
Figure 4D:
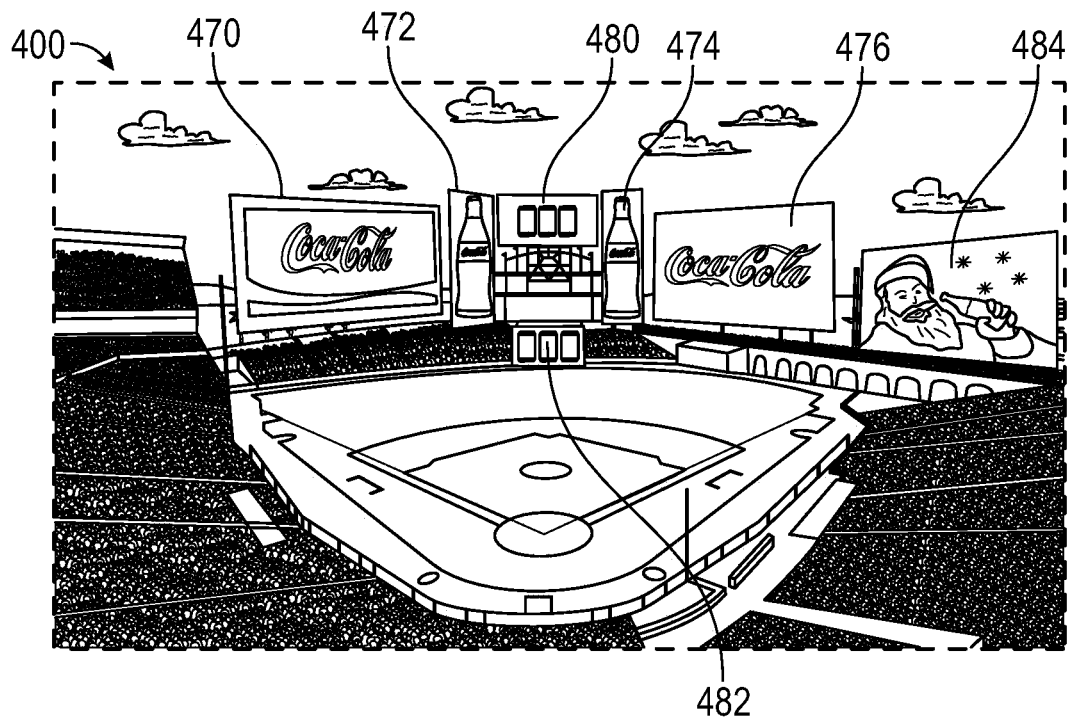
FIG. 4D shows an example broadcast image of the venue view in FIG. 4A with content inserted in the green screens in FIG. 4C.

FIG. 4C shows the insertion of respective green screens 440, 442, 444, and 446 in each of the virtual billboard locations 120, 122, 124, and 126, via the process in FIG. 2. Additional green screens 448, 450, and 452 that are inserted in billboard locations that are defined by the frames 420, 422, and 424 in FIG. 4B. Additional green screens 460 and 462 may be inserted in the locations 120 and 126 respectively. FIG. 4D shows a broadcast image of the venue 100 after the insertion of content images 470, 472, 474, and 476 in each of the respective green screens 440, 442, 444, and 446. Additional content images 480, 482, and 484 are inserted into the respective green screens 448, 450, and 452 in FIG. 4C. The broadcast image in FIG. 4D is sent to a live feed for the event occurring in the venue 100 in FIG. 1.

Figure 4E:
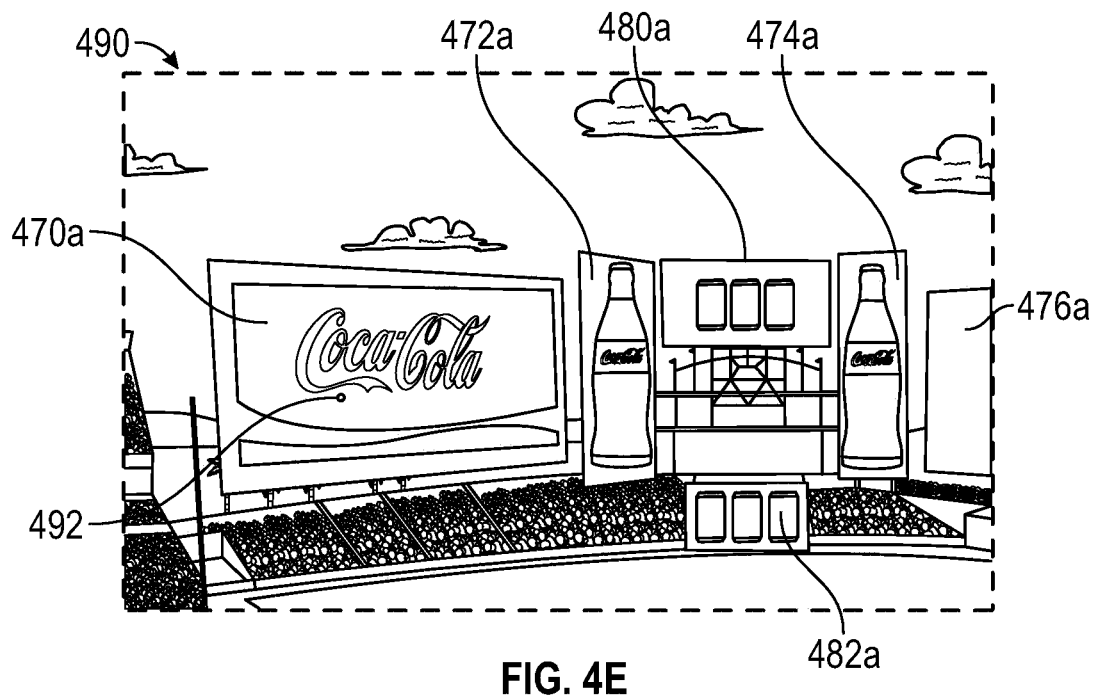
FIG. 4E shows an example broadcast image of the venue view in FIG. 4A at a different zoom depth.

FIG. 4E shows a different broadcast image of a different camera view 490 in real time. In this example, the camera has panned to the left and zoomed in. Thus, the augmented reality system 154 selects another set of pre-rendered content images to insert in the greenscreens of the virtual billboards viewable in the camera view 490. Thus, the content images 470a, 472a, 480a, 482a, and 474a are pre-rendered to match the different PTZ metadata of the camera view 490. In this example, an image 476a is a partial image as only a portion of the virtual billboard location 126 may be seen in the view 490. Due to the position of the view 490, the content image on the virtual billboard location 424 in FIG. 4B is not shown. In this example, a broadcast image of a baseball 492 may be superimposed on the content image 470a according to the silhouette process explained in FIG. 3.

Figure 4F:
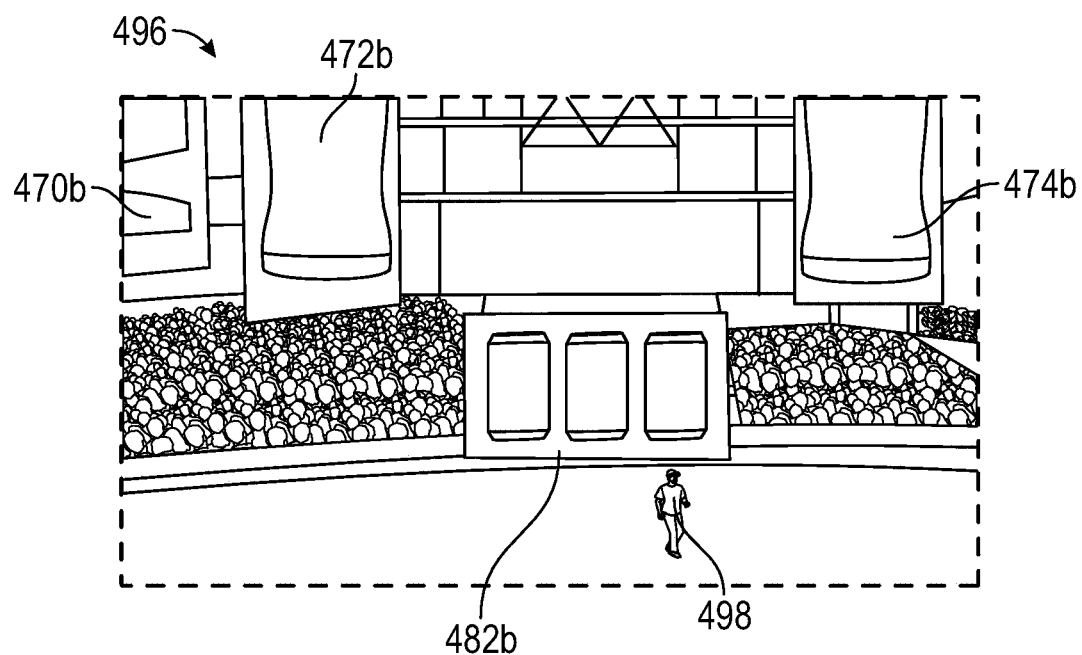
FIG. 4F shows an example broadcast image of the venue view in FIG. 4A at a different zoom depth with an object superimposed on the content.

FIG. 4F shows another different broadcast image of a different camera view 496 in real time. In this example, the camera has zoomed in on a player 498. Thus, the AR system 154 has selected another set of pre-rendered content images to insert in the greenscreens of the virtual billboards viewable in the camera view 496. Thus, a content image 482b is pre-rendered to match the different PTZ metadata of the camera view 496 and inserted in the broadcast image. In this example, content images 470b, 472b, and 47b are only partially shown as only a portion of the respective virtual billboard locations are viewable in the view 496.

Figure 5A:
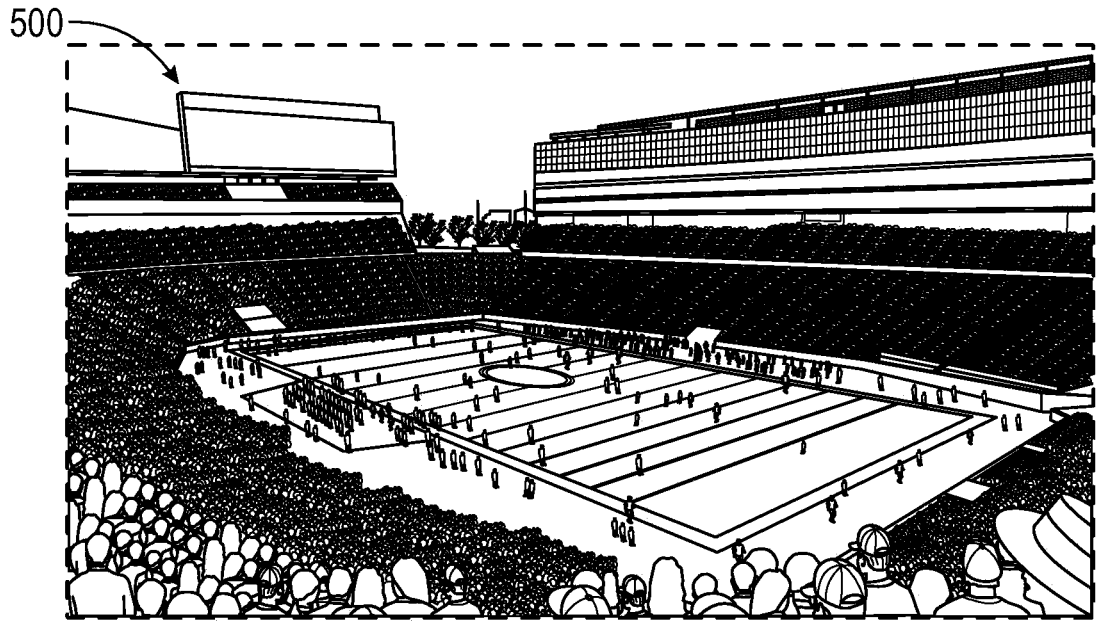
FIG. 5A is an example camera view of another example stadium venue.
Figure 5B:
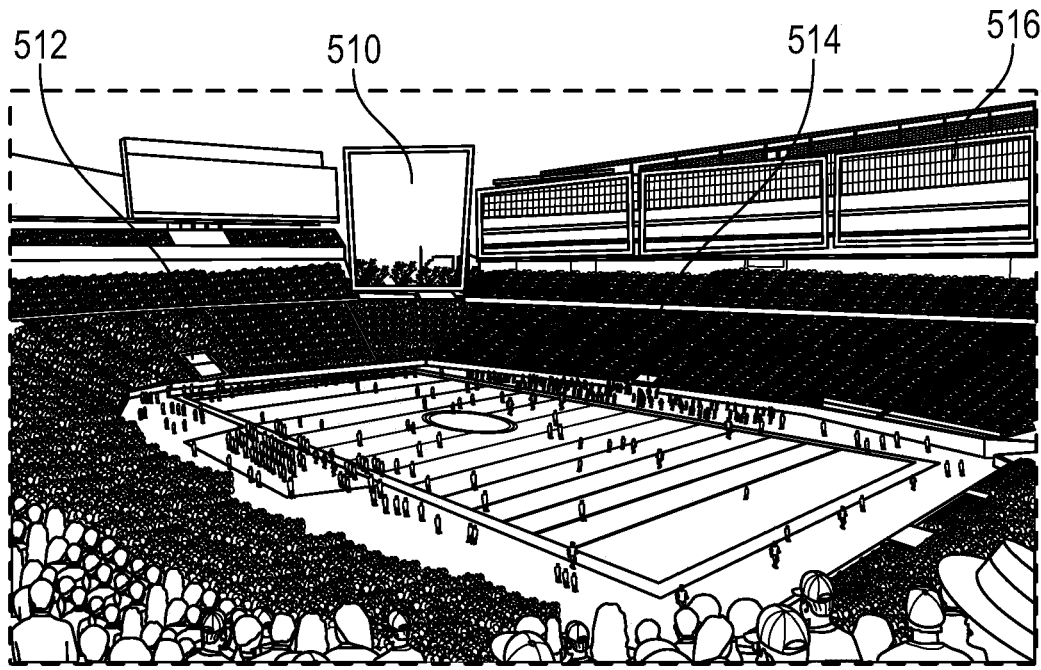
FIG. 5B shows an example set of skeleton frames overlaying the venue from the camera view in FIG. 5A.
Figure 5C:
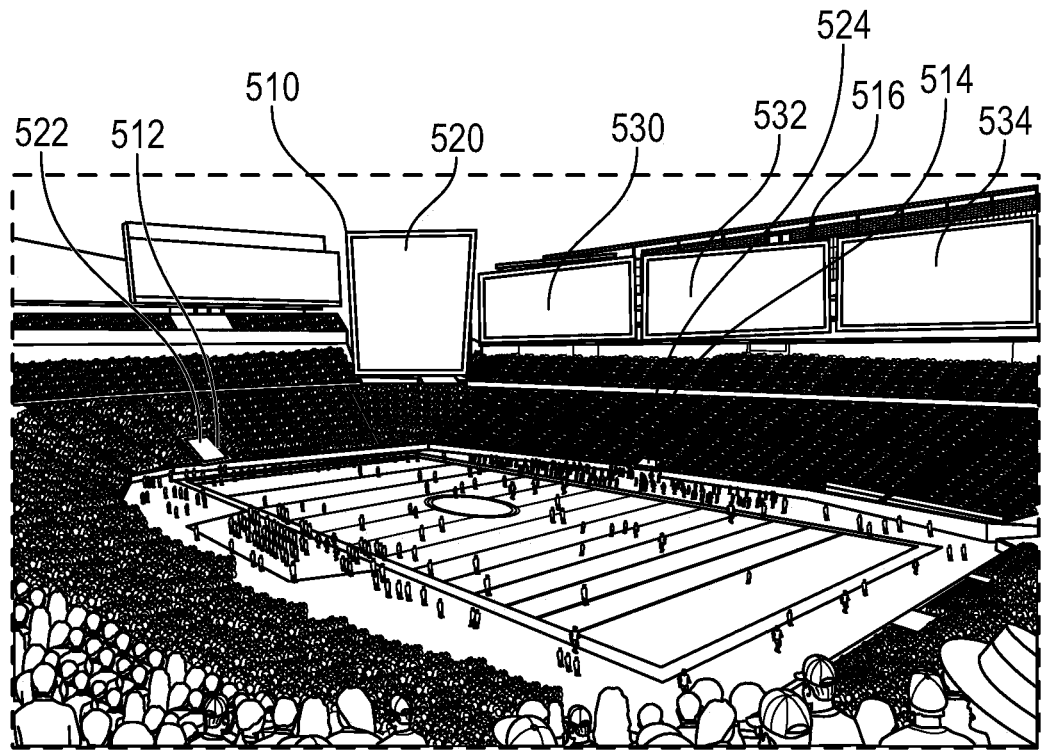
FIG. 5C shows an example imposition of green screens on the skeleton frames in FIG. 5B.

FIG. 5A shows a camera view 500 of another example venue. In this example, the venue is a football stadium. The camera view 500 shows the actual physical elements of the football stadium. FIG. 5B shows the camera view of the venue in FIG. 5A with a series of skeleton frames 510, 512, 514, and 516 for virtual billboard locations generated by the process in FIG. 2 from the view of a camera. In this example, the frames may be generated from either location transmitters or position reference points or both. FIG. 5C shows the application of green screens 520, 522, and 524 for the respective frames 510, 512, and 514 in FIG. 5B. Another frame 516 has three different green screens 530, 532, and 534 that may each receive different image content. FIG. 4D shows a broadcast image of the venue in FIG. 5A after the insertion of content images 540, 542, and 544 in each of the respective green screens 520, 522, and 524 in FIG. 5C. In this example, content images 550, 552, and 554 are inserted in the green screens 530, 532, and 534 in FIG. 5C.

Figure 6A:
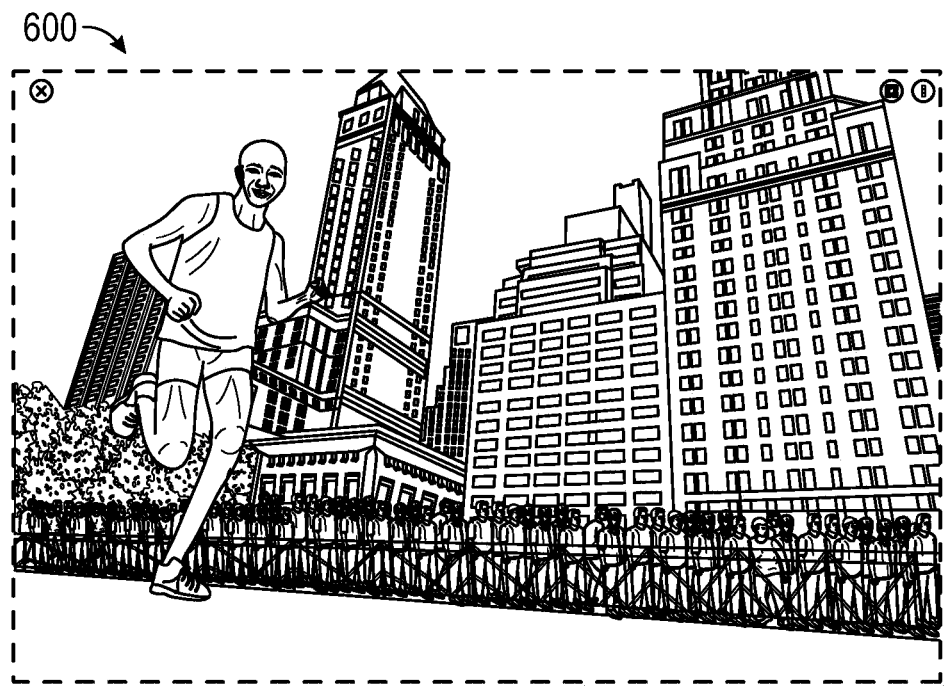
FIG. 6A is a camera view of an example outdoor horizontal street venue.
Figure 6B:
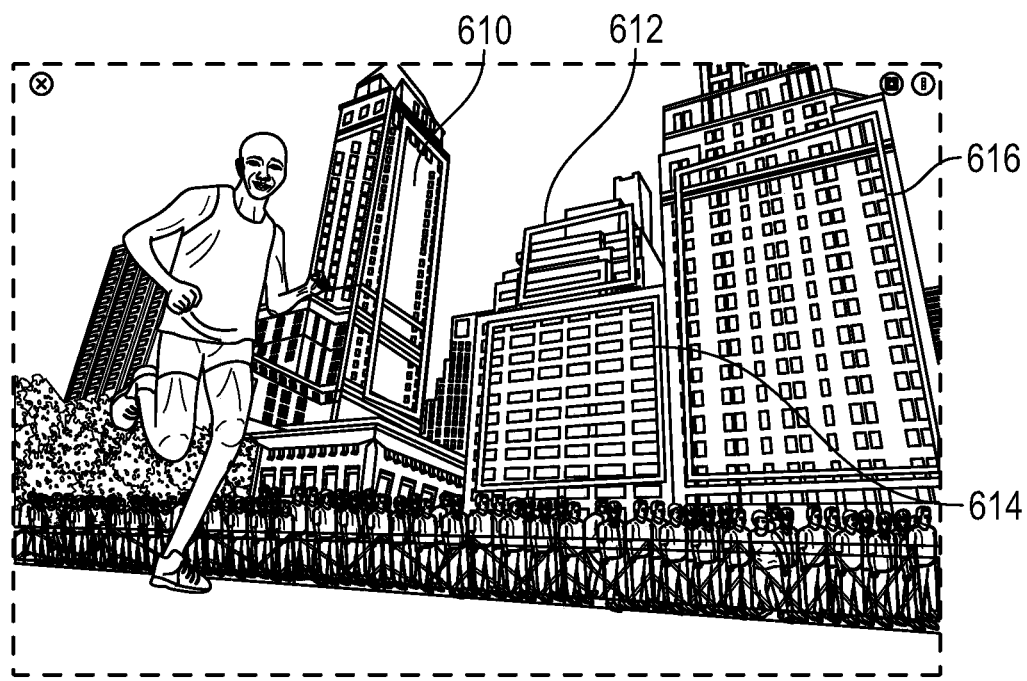
FIG. 6B shows an example set of skeleton frames overlaying the horizontal street venue from the camera view in FIG. 6A.
Figure 6C:
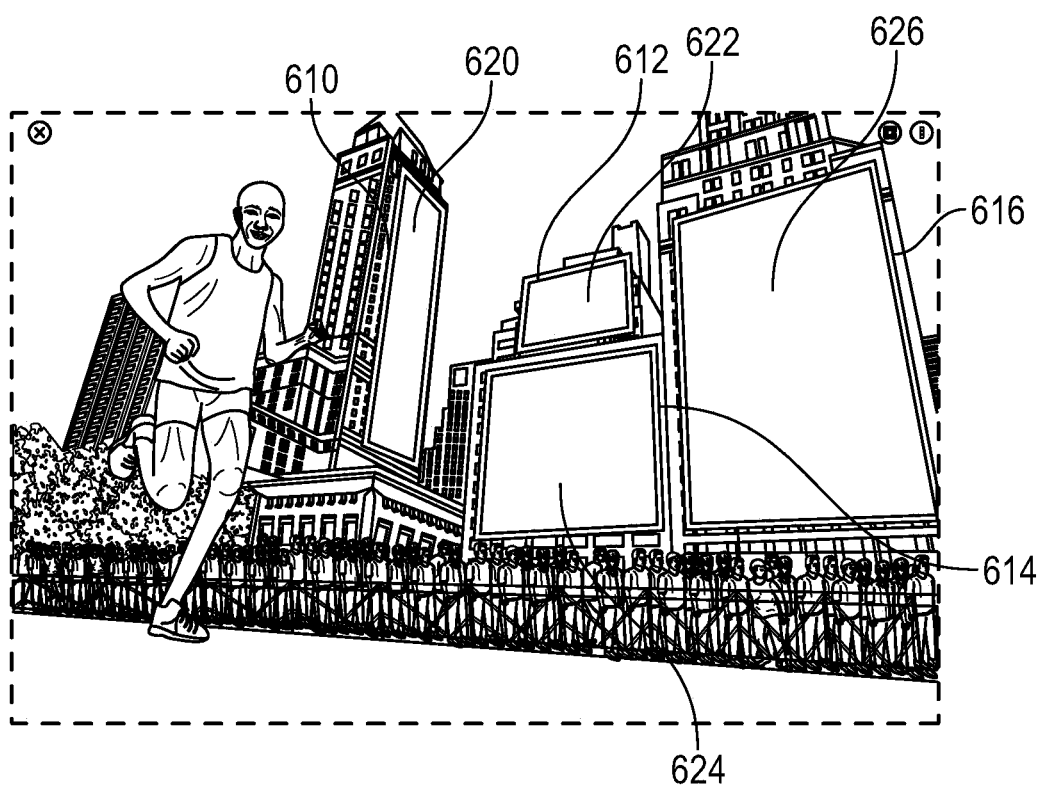
FIG. 6C shows an example imposition of green screens on the skeleton frame in FIG. 6B.
Figure 6D:
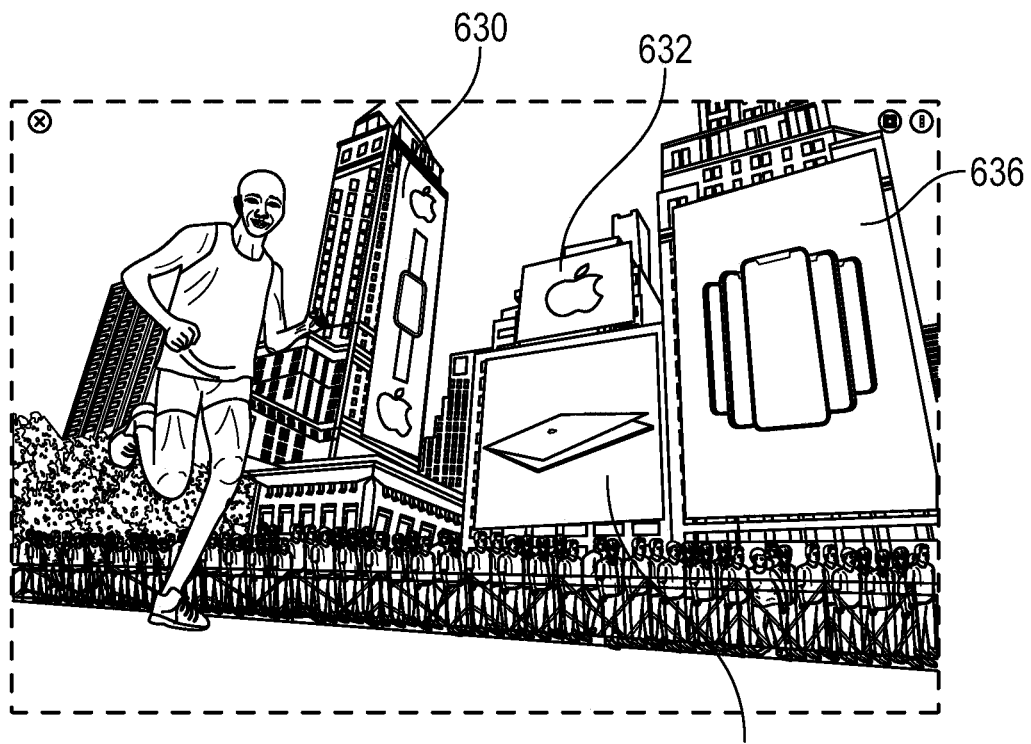
FIG. 6D shows an example broadcast image of the horizontal street view in FIG. 6A with content inserted in the green screens in FIG. 6C.

FIG. 6A shows a camera view 600 of another potential venue that may be a horizontal action location such as a race through a city street and background buildings. FIG. 6B shows the camera view in FIG. 6A with a series of skeleton frames 610, 612, 614, and 616 defining different areas in the venue for virtual billboard locations. In this example, the frame 610 is anchored on the side of a building, thus allowing bordering surfaces to be used to display content on streetscapes for road based events in the venue. FIG. 6C shows green screens 620, 622, 624, and 626 interposed on the respective skeleton frames 610, 622, 624, and 626 on different areas shown in the camera view. FIG. 6D shows the broadcast image of the camera view with content images 630, 632, 634, and 636 inserted on the green screens 620, 622, 624, and 634 in FIG. 6C.

Figure 7A:
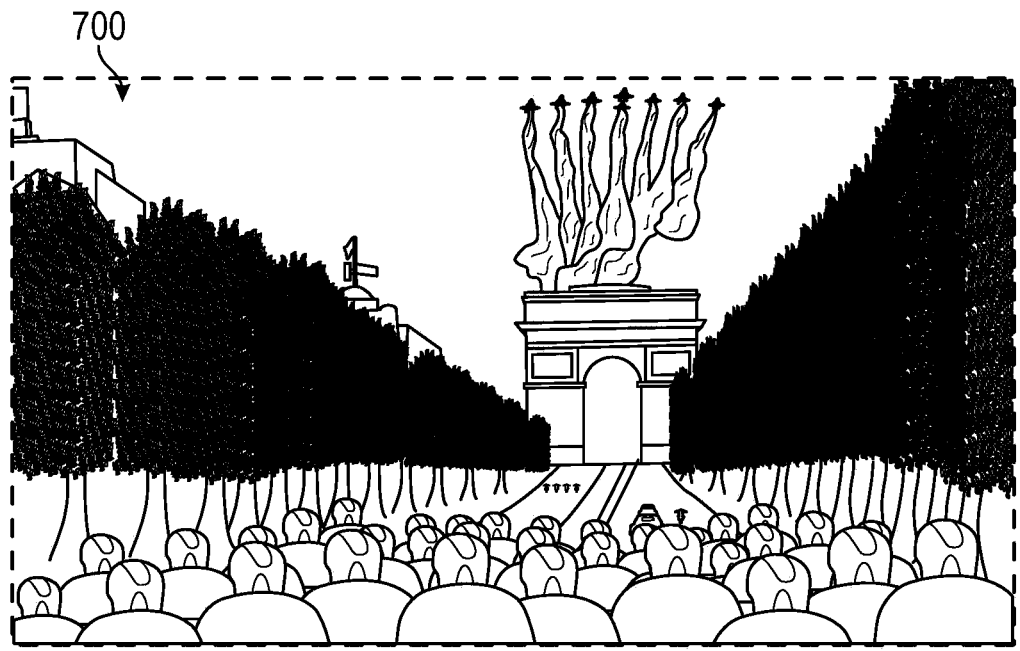
FIG. 7A is a camera view of another example outdoor horizontal street venue.
Figure 7B:
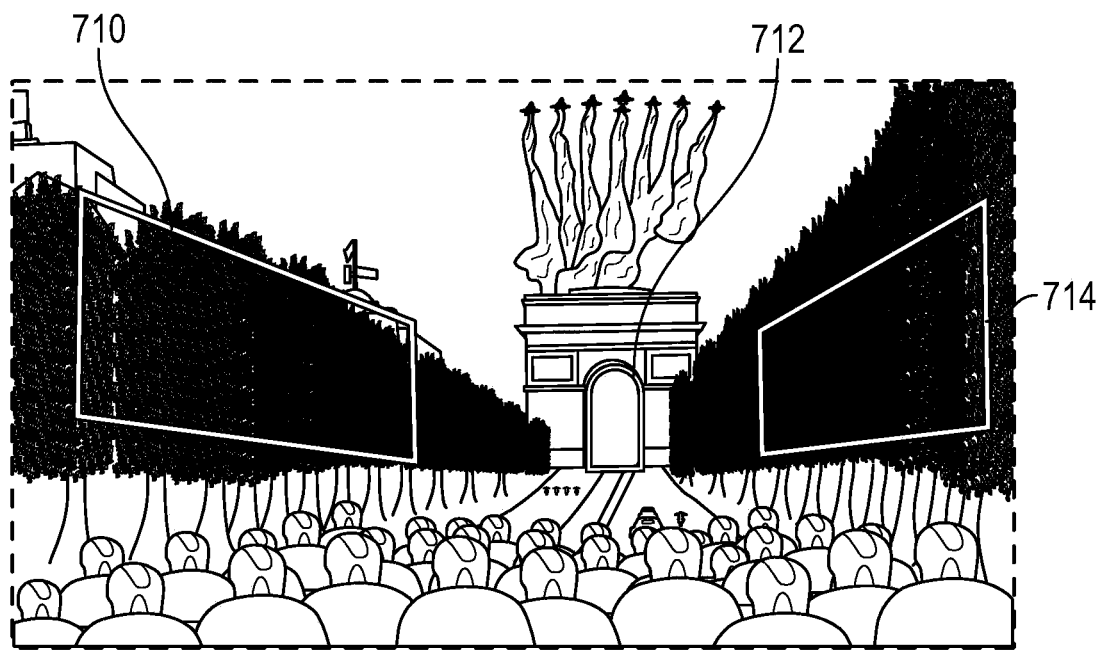
FIG. 7B shows an example set of skeleton frames overlaying the horizontal street venue from the camera view in FIG. 7A.
Figure 7C:
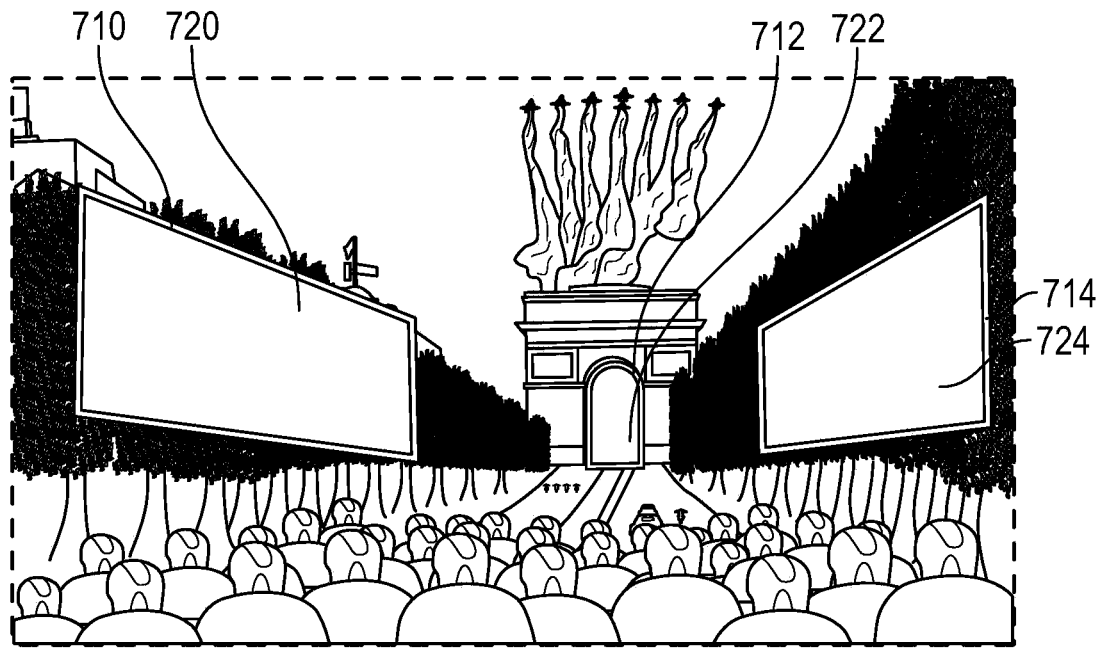
FIG. 7C shows the example imposition of green screens on the skeleton frames in FIG. 7B.
Figure 7D:
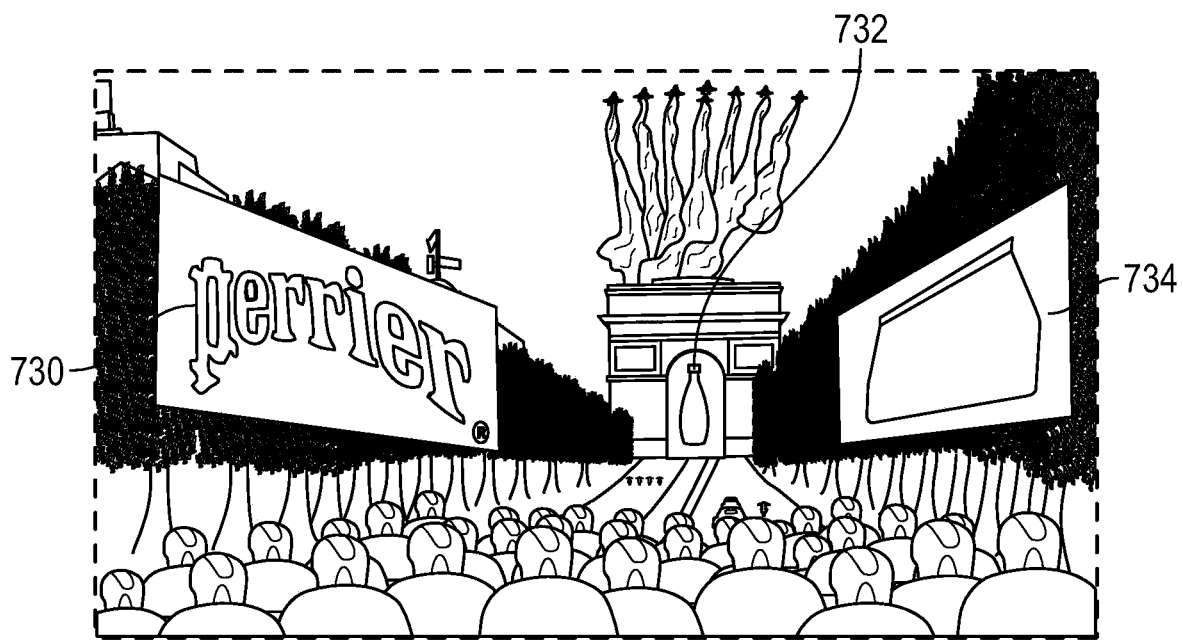
FIG. 7D shows an example broadcast image of the horizontal street venue view in FIG. 7A with content inserted in the green screens in FIG. 7C.

FIG. 7A shows a camera view 700 of another potential horizontal venue that may be a location such as a city street holding a sporting event. FIG. 7B shows the camera view in FIG. 7A with a series of skeleton frames 710, 712, and 714 defining different areas in the venue for virtual billboard locations. FIG. 7C shows green screens 720, 722, and 724 interposed on the respective skeleton frames 710, 712, and 714. FIG. 7D shows the broadcast image of the camera view with content images 730, 732, and 734 inserted on the green screens 720, 722, and 724 in FIG. 7C. In this example, the content image 732 is inserted against a sky background as the location 712 is in a sky backdrop.

The example automated, massively pre-rendered approach to digital content overcomes current limitations on viewer experience by limiting frame to frame transitions in digital insertions to less than 10 pixels—a level that can be detected by viewers of composited augmented reality video. The example augmented reality is particularly advantageous in situations where highly unpredictable and rapid changes in pan, tilt, and zoom for each camera make live rendering impractical without unacceptable time lags or poor image quality of digitally inserted content.

An advantage of the example data collection, rendering and augmented reality systems is to efficiently and cost effectively expand the number and size of content display locations for broadcast or streaming audiences within and around live event venues. The disclosed system allows new virtual advertising opportunities where a physical sign could not be physically installed, or where a physical sign would block audience views or critical infrastructure.

The example system enables the expansion of virtual billboard sizes beyond physical limitations in real world settings. The virtual billboard sizes generated by the system are limited only by the content image and venue design preferences. The example system allows the placement of virtual billboards to cover the entire side or sides of existing buildings and other structures on streetscapes for road based events.

Figure 5D:
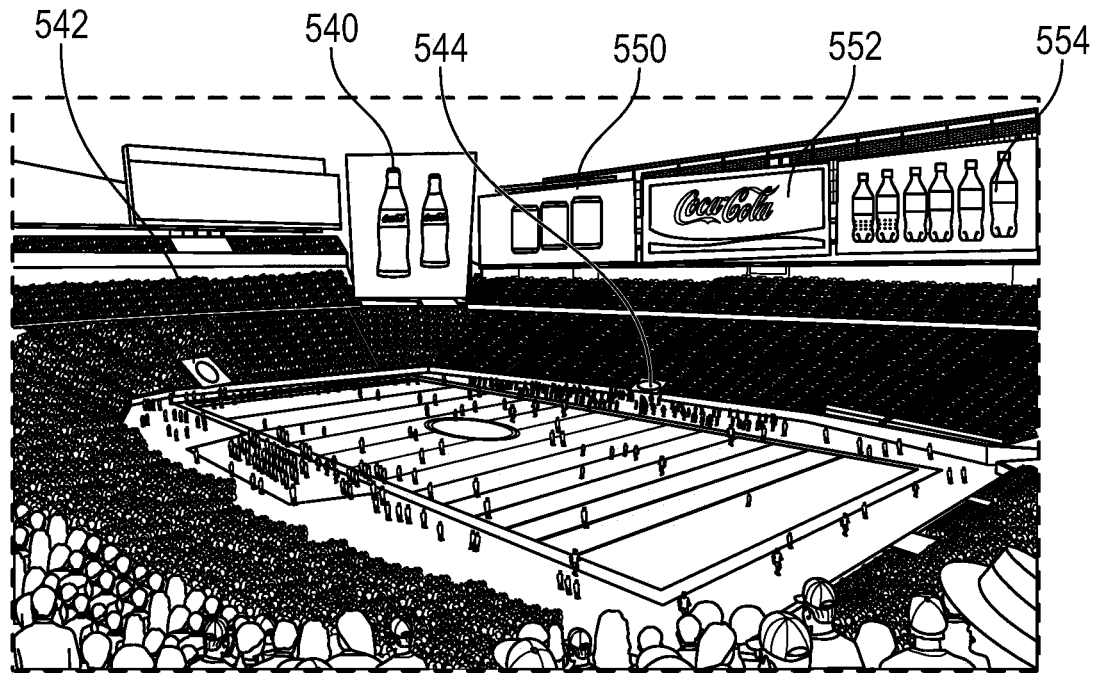
FIG. 5D shows an example broadcast image of the venue view in FIG. 5A with content inserted in the green screens in FIG. 5C.

The system also allows creation of virtual 3-D structures to attach virtual billboards to in areas without physical structure. For example, a virtual object with virtual signage may be added to a real time camera feed during live events. This is shown in FIG. 5D and FIG. 7D. Further, the example process may interpose other objects in green screen shapes other than rectangles using coordinates correlated with PTZ meta data. For example, a green screen shape for a specific object such as a blimp, floating banner, or the like, may be interposed in each camera view.

The use of different images for the same virtual billboard also allows dynamic advertising content changes during an event to maximize utility versus the static messaging content of conventional physical billboards. The example system also enables multiple differentiated messages to be delivered simultaneously to different target audiences versus the fixed messaging content of conventional signage.

The example system allows removal of existing physical billboards at venues. The elimination of the use of physical billboards may improve live experience of audiences and enable venue owners to avoid the costly replacement cycles for the physical billboards. The replacement of physical signs may improve venue safety as the virtual content may be placed over points of entry and egress and old physical signs may thus be removed from those areas.

The system avoids permitting, contract negotiations and lease costs relating to providing physical billboards. The system also allows the opportunity to add virtual billboard signage to horizontal high traffic areas (e.g., sports playing fields, ice rinks, swimming pools, bowling lanes etc.).

The example system also allows the addition of virtual airborne objects (e.g., blimps, balloons, parachutes, and aircraft and the like) each with associated virtual content to a broadcast feed. Although these examples relate to broadcast from cameras, the principles herein could be applied to any broadcast to any applicable medium. For example, the feed could be provided to virtual reality headsets and devices where such devices are pre-loaded with the rendered virtual billboard data and related image content.

Other objects and advantages of the present invention will become obvious to the reader and it is intended that these objects and advantages are within the scope of the present invention.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

In one example, a computing device may be configured to perform one or more of the processes described above. the computing device can comprise a processor, a memory, a storage device, an I/O interface, and a communication interface, which may be communicatively coupled by way of a communication infrastructure. In certain embodiments, the computing device can include fewer or more components than those described above.

In one or more embodiments, the processor includes hardware for executing instructions, such as those making up a computer program. As an example and not by way of limitation, to execute instructions for digitizing real-world objects, the processor may retrieve (or fetch) the instructions from an internal register, an internal cache, the memory, or the storage device and decode and execute them. The memory may be a volatile or non-volatile memory used for storing data, metadata, and programs for execution by the processor(s). The storage device includes storage, such as a hard disk, flash disk drive, or other digital storage device, for storing data or instructions related to object digitizing processes (e.g., digital scans, digital models).

The I/O interface allows a user to provide input to, receive output from, and otherwise transfer data to and receive data from computing device. The I/O interface may include a mouse, a keypad or a keyboard, a touch screen, a camera, an optical scanner, network interface, modem, other known I/O devices or a combination of such I/O interfaces. The I/O interface may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface is configured to provide graphical data to a display for presentation to a user. The graphical data may be representative of one or more graphical user interfaces and/or any other graphical content as may serve a particular implementation.

The communication interface can include hardware, software, or both. In any event, the communication interface can provide one or more interfaces for communication (such as, for example, packet-based communication) between the computing device and one or more other computing devices or networks. As an example and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI.

Additionally, the communication interface may facilitate communications with various types of wired or wireless networks. The communication interface may also facilitate communications using various communication protocols. The communication infrastructure may also include hardware, software, or both that couples components of the computing device to each other. For example, the communication interface may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a "control system" on data stored on one or more computer-readable storage devices or received from other sources.

The term "control system" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above-described embodiments. Rather, the scope of the invention should be defined in accordance with the following claims and their equivalents.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A method of projecting an image on a sub-area of an area in a field of view of a first camera, the method comprising:
    capturing a frame image of the area and the sub-area from the first camera;
    determining real-time pan, tilt, zoom and location data of the first camera corresponding to the frame image of the area;
    comparing the real-time pan, tilt, zoom and location data of the first camera corresponding to the frame image of the area with collected pan, tilt, and zoom data of the first camera for a plurality of pan, tilt, and zoom positions from a venue data library;
    determining a corresponding pre-rendered first content image and reference point data of a perimeter of the sub-area corresponding to one of the plurality of pan, tilt, and zoom positions from the venue data library based on the comparison;
    applying the corresponding pre-rendered first content image to the sub-area in the frame image to create a first broadcast image; and
    broadcasting the first broadcast image with the applied pre-rendered first content image in the sub-area.

2. The method of claim 1, further comprising:
    determining a corresponding pre-rendered second content image corresponding to one of the plurality of pan, tilt, and zoom positions from the venue data library based on the comparison, wherein the corresponding pre-rendered second content image is different from the corresponding pre-rendered first content image;
    applying the corresponding pre-rendered second content image to the sub-area in the frame image at a different time to create a second broadcast image; and
    broadcasting the second broadcast image with the applied pre-rendered second content image on the sub-area at the different time.

3. The method of claim 1, further comprising:
    capturing a second frame image of the area and the sub-area from a second camera having a different location than the first camera;
    determining real-time pan, tilt, zoom and location data of the second camera corresponding to the second frame image of the area from the second camera;
    comparing the real-time pan, tilt, zoom and location data of the second camera corresponding to the second frame image of the area with collected pan, tilt, and zoom data of the second camera for a plurality of pan, tilt, and zoom positions of the second camera from the venue data library;
    determining a corresponding pre-rendered second content image and reference point data of the perimeter of the sub-area corresponding to one of the plurality of pan, tilt, and zoom positions of the second camera from the venue data library;
    applying the corresponding pre-rendered second content image to the sub-area in the second frame image from the second camera to create a second broadcast image; and
    broadcasting the second broadcast image with the applied pre-rendered second content image on the sub-area.

4. The method of claim 1, further comprising:
    determining an ambient condition of the area; and
    filtering the corresponding pre-rendered first content image based on the ambient condition of the area.

5. The method of claim 4, wherein the ambient condition is one of weather or time of day, and wherein the filtering changes lighting of the corresponding pre-rendered first content image.

6. The method of claim 1, further comprising:
    tracking an object from the frame image in the sub-area; and
    inserting the object into the sub-area to replace part of the corresponding pre-rendered first content image for the first broadcast image.

7. The method of claim 6, wherein the object is inserted if the object is above a threshold value.

8. The method of claim 1, further comprising:
    capturing a series of frame images from the first camera including the frame image;
    determining a rate of change between pan, tilt, and zoom positions of the first camera in capturing the series of frame images;
    creating an interpolation frame to smooth the corresponding pre-rendered first content image between the series of frame images; and
    adding the interpolation frame to the sub-area of the first broadcast image.

9. The method of claim 1, wherein the area is in an event or a sports venue.

10. A system to project an image on a sub-area of an area for broadcast, the system comprising:
a first camera capturing a frame image of the area and the sub-area, the first camera capturing real-time pan, tilt, zoom data of the first camera corresponding to the frame image;
a venue data library of collected pan, tilt, and zoom position data for the first camera, reference point data of a perimeter of the sub-area for each pan, tilt, and zoom position of the first camera, and corresponding pre-rendered content images for each pan, tilt, and zoom position of the first camera; and
an augmented reality engine coupled to the venue data library, the augmented reality engine operable to:
compare the real-time pan, tilt, zoom and location data of the first camera corresponding to the frame image to the collected pan, tilt, and zoom position data for the first camera;
determine at least one pan, tilt, and zoom position for the first camera based on the comparison; and
interpose a corresponding pre-rendered first content image from the venue data library on the sub-area of the frame image to create a first broadcast image.

11. The system of claim 10, wherein the augmented reality engine is further operable to broadcast the first broadcast image.

12. The system of claim 11, wherein the augmented reality engine is further operable to:
determine a corresponding pre-rendered second content image stored in the venue data library corresponding to one of a plurality of pan, tilt, and zoom positions from the venue data library based on the comparison, wherein the corresponding pre-rendered second content image is different from the corresponding pre-rendered first content image;
apply the corresponding pre-rendered second content image to the sub-area in the frame image at a different time to create a second broadcast image; and
broadcast the second broadcast image with the applied pre-rendered second content image on the sub-area at the different time.

13. The system of claim 10, further comprising:
a second camera having a different location than the first camera, the second camera capturing a second frame image of the area and the sub-area, the second camera capturing real-time pan, tilt, zoom, and location data of the second camera corresponding to the second frame image; and
wherein the augmented reality engine is operable to:
determine the real-time pan, tilt, zoom and location data of the second camera corresponding to the second frame image of the area from the second camera;
compare the real-time pan, tilt, zoom and location data of the second camera corresponding to the second frame image of the area captured by the second camera with collected pan, tilt, and zoom data of the second camera for a plurality of pan, tilt, and zoom positions of the second camera from the venue data library;
determine a corresponding pre-rendered second content image and the reference point data of the perimeter of the sub-area corresponding to one of the plurality of pan, tilt, and zoom positions of the second camera from the venue data library; and
apply the corresponding pre-rendered second content image to the sub-area in the second frame image from the second camera to create a second broadcast image.

14. The system of claim 10, wherein the augmented reality engine is further operable to:
determine an ambient condition of the area; and
filter the corresponding pre-rendered first content image based on the ambient condition of the area.

15. The system of claim 14, wherein the ambient condition is one of weather or time of day, and wherein the filtering changes lighting of the corresponding pre-rendered first content image.

16. The system of claim 10, wherein the augmented reality engine is further operable to:
track an object from the frame image in the sub-area; and
insert the object into the sub-area to replace part of the corresponding pre-rendered first content image for the first broadcast image.

17. The system of claim 16, wherein the object is inserted if the object is above a threshold value.

18. The system of claim 10, wherein the augmented reality engine is further operable to:
receive a series of frame images from the first camera including the frame image;
determine a rate of change between pan, tilt, and zoom positions of the first camera in capturing the series of frame images;
create an interpolation frame to smooth the corresponding pre-rendered first content image between the series of frame images; and
add the interpolation frame to the sub-area of the first broadcast image.

19. The system of claim 10, wherein the area is in an event or a sports venue.

20. A non-transitory computer-readable medium having machine-readable instructions stored thereon, which when executed by a processor, cause the processor to:
receive a frame image of an area and a sub-area captured from a first camera;
receive real-time pan, tilt, zoom and location data of the first camera corresponding to the frame image of the area;
compare the real-time pan, tilt, zoom and location data of the first camera corresponding to the frame image of the area with collected pan, tilt, and zoom data of the first camera for a plurality of pan, tilt, and zoom positions from a venue data library;
determine a corresponding pre-rendered first content image and reference point data of a perimeter of the sub-area corresponding to one of the plurality of pan, tilt, and zoom positions from the venue data library based on the comparison; and
apply the corresponding pre-rendered first content image to the sub-area in the frame image to create a broadcast image.

* * * * *